(12) United States Patent
Wang

(10) Patent No.: US 10,788,743 B2
(45) Date of Patent: Sep. 29, 2020

(54) RETROREFLECTIVE DISPLAY SYSTEMS CONFIGURED TO DISPLAY IMAGES USING SHAPED LIGHT PROFILE

(71) Applicant: MirraViz, Inc., Fremont, CA (US)

(72) Inventor: Michael Wang, Sunnyvale, CA (US)

(73) Assignee: MirraViz, Inc., Fremont, CA (US)

( * ) Notice: Subject to any disclaimer, the term of this patent is extended or adjusted under 35 U.S.C. 154(b) by 194 days.

(21) Appl. No.: 15/952,148

(22) Filed: Apr. 12, 2018

(65) Prior Publication Data
US 2018/0299762 A1    Oct. 18, 2018

Related U.S. Application Data

(60) Provisional application No. 62/485,301, filed on Apr. 13, 2017.

(51) Int. Cl.
*G02B 5/124* (2006.01)
*G03B 21/60* (2014.01)
*G02B 5/04* (2006.01)

(52) U.S. Cl.
CPC .......... *G03B 21/60* (2013.01); *G02B 5/045* (2013.01); *G02B 5/124* (2013.01)

(58) Field of Classification Search
CPC ......... G03B 21/60; G02B 5/045; G02B 5/124
USPC ........................................ 359/530
See application file for complete search history.

(56) References Cited

U.S. PATENT DOCUMENTS

| | | | |
|---|---|---|---|
| 5,763,049 A | 6/1998 | Frey et al. | |
| 6,323,999 B1 * | 11/2001 | Ueda | G02B 27/2228 353/7 |
| 6,347,873 B1 | 2/2002 | Hosseini et al. | |
| 7,261,424 B2 | 8/2007 | Smith | |
| 8,465,193 B1 | 6/2013 | Arik et al. | |
| 9,244,339 B2 | 1/2016 | Wang | |
| 9,807,378 B2 | 10/2017 | Wang et al. | |
| 9,807,379 B2 | 10/2017 | Wang et al. | |
| 9,807,380 B2 | 10/2017 | Wang et al. | |
| 9,864,264 B2 | 1/2018 | Wang et al. | |

(Continued)

FOREIGN PATENT DOCUMENTS

| | | |
|---|---|---|
| WO | WO 2015/187433 | 12/2015 |
| WO | WO 2018/027071 | 2/2018 |
| WO | WO 2018/111939 | 6/2018 |

OTHER PUBLICATIONS

International Preliminary Report on Patentability dated Oct. 24, 2019 in PCT Application No. PCT/US2018/027380; 13 pages.

(Continued)

*Primary Examiner* — Euncha P Cherry
(74) *Attorney, Agent, or Firm* — Knobbe, Martens, Olson & Bear, LLP

(57) ABSTRACT

The disclosed technology generally relates to displays, and more particularly to display screens configured to display images having a shaped light profile. A display screen comprises a retroreflective display medium configured to display an image by retroreflectively reflecting incident light from a light source. The display screen additionally comprises a light profile shaping medium interposed between the retroreflective display medium and the light source. The light profile shaping medium is configured to shape an intensity distribution of light reflected from the retroreflective display medium prior to displaying the image to a viewer.

24 Claims, 14 Drawing Sheets

(56) References Cited

U.S. PATENT DOCUMENTS

| | | | |
|---|---|---|---|
| 9,977,320 B2 | 5/2018 | Wang | |
| 2002/0050976 A1* | 5/2002 | Yamaguchi | G02F 1/167 345/105 |
| 2004/0085260 A1 | 5/2004 | McDavid | |
| 2006/0181493 A1 | 8/2006 | Satoh | |
| 2010/0253916 A1 | 10/2010 | Gao et al. | |
| 2011/0044061 A1 | 2/2011 | Santoro et al. | |
| 2012/0076353 A1 | 3/2012 | Large | |
| 2012/0188791 A1 | 7/2012 | Voloschenko et al. | |
| 2013/0342813 A1 | 12/2013 | Wang | |
| 2015/0056561 A1 | 2/2015 | Ang et al. | |
| 2016/0012630 A1 | 1/2016 | Bell | |
| 2016/0199729 A1 | 7/2016 | Wang | |
| 2016/0212417 A1 | 7/2016 | Ng et al. | |
| 2017/0251203 A1 | 8/2017 | Wang | |
| 2018/0292741 A1 | 10/2018 | Wang | |
| 2019/0293846 A1 | 9/2019 | Wang et al. | |

OTHER PUBLICATIONS

26° Light Turning Film,Film Optics Ltd., APF36/55/105/250PC Technical Specification, Sep. 7, 2016, Issue No. 3, United Kingdom, in 2 pages.

279 LPI Lenticular Diffuser,Film Optics Ltd., LF279/250PC Technical Specification, Apr. 4, 2016, Issue No. 2, United Kingdom, in 2 pages.

International Search Report and Written Opinion dated Mar. 26, 2018 in International Application No. PCT/US2017/065910.

International Search Report and Written Opinion dated Aug. 10, 2018 PCT/US2018/027380, in 15 pages.

LUMINIT, Direction Turning Film—Lighting Application, www.luminitco.com, Jun. 28, 2016 in 2 pages.

LUMINIT, Lenticular Batwing Diffuser, www.luminitco.com, 2016 in 4 pages.

LUMINIT, Light Shaping Diffusers—Technical Data Sheet, www.luminitco.com, Aug. 24, 2016 in 2 pages.

U.S. Appl. No. 62/485,301, filed Apr. 13, 2017, Wang.
U.S. Appl. No. 62/551,288, filed Aug. 29, 2018, Wang et al.
U.S. Appl. No. 62/730,838, filed Sep. 13, 2018, Chapman et al.
U.S. Appl. No. 16/670,950, filed Oct. 31, 2019, Wang.
U.S. Appl. No. 61/660,651, dated Jun. 15, 2012, Wang.
U.S. Appl. No. 61/997,206, dated May 27, 2014, Wang.
U.S. Appl. No. 62/122,662, dated Oct. 27, 2014, Wang.
U.S. Appl. No. 62/255,218, dated Nov. 13, 2015, Wang.
U.S. Appl. No. 62/307,385, dated Mar. 11, 2016, Wang.
U.S. Appl. No. 62/370,690, dated Aug. 3, 2016, Jiang et al.
U.S. Appl. No. 62/370,687, dated Aug. 3, 2016, Wang.
U.S. Appl. No. 62/433,396, dated Dec. 13, 2016, Wang et al.

* cited by examiner

RETROREFLECTIVE DISPLAY SYSTEMS CONFIGURED TO DISPLAY IMAGES USING SHAPED LIGHT PROFILE

CROSS-REFERENCE TO RELATED APPLICATIONS

This application claims the benefit of priority of and incorporates by reference the entirety of U.S. Provisional Application No. US 62/485,301, filed Apr. 13, 2017. All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BACKGROUND

Field

The disclosed technology generally relates to displays, and more particularly to displays configured to display viewing position-dependent images.

Description of the Related Technology

Current state-of-the-art display systems include either flat-panel displays or projector-based displays. The flat-panel displays are generally based on liquid crystal display (LCD) pixels with light emitting diode (LED) backlighting, plasma-based screens, organic light emitting device (OLED) based, or discrete LED based systems. In these display systems, it is difficult to attain screen sizes significantly larger than 80 inches at low cost in width due to several considerations. For flat-panel displays, nonlinear increases in cost as the screen size grows, as well as high power consumption, may limit screen sizes to below 80 inches at typical consumer price points. For projection-based displays, factors that can limit screen sizes include: decreased brightness, increased power consumption, large projector size and projector noise. Additionally, for these types of display systems, it may not be generally technically feasible, or it may be prohibitively expensive to implement multi-viewer capabilities into the system that allow each of multiple viewers to view completely different content over the entire area of the screen at same time.

An alternative display system has been proposed to use a retro-reflective (RR) display surface to allow for increase display size with high brightness levels and multi-viewer capability. Current state-of-the-art retro-reflective material is opaque sheeting that reflects light back to its source. The typical usage for this material is in traffic safety and security. Retro-reflective sheeting used for traffic purposes include signs, asphalt reflectors, wearables and automobiles. Typical source of light is from automobile and motorcycle headlights. Retro-reflective sheeting used for security purposes include warnings and directions. Typical light sources include airplanes, boats, and cars.

Furthermore, current state-of-the-art retro-reflective systems do not engineer the retro-reflective material to be optimized for RR display systems.

SUMMARY

In one aspect, a retro-reflective display screen configured to display images using a shaped light profile comprises a retro-reflective display medium configured to display an image by retro-reflectively reflecting incident light from a light source. The display screen additionally comprises a light profile shaping medium interposed between the retro-reflective display medium and the light source. The light profile shaping medium is configured to shape an intensity distribution of light reflected from the retro-reflective display medium, prior to displaying the image to a viewer.

In various embodiments, the retro-reflective display medium comprises retro-reflective elements that are configured to retro-reflectively reflect incident light into reflected light having an intrinsic spatial shape or profile having, e.g., an intrinsic intensity distribution. Without additional layers or media between the light source and the retro-reflective display medium to significantly change or alter the intrinsic spatial shape or profile, the viewer would see the intrinsic spatial shape or profile that is predominantly determined by retro-reflective elements of the retro-reflective display medium. According to various embodiments described herein, the display screen additionally comprises the light profile shaping medium that is configured to shape, modify or change the intrinsic spatial shape or profile that would generated by the retro-reflective display medium. In some embodiments, the light profile shaping medium is configured to broaden or diffuse the intrinsic intensity distribution along at least one direction parallel to a major surface of the light profile shaping medium. In some other embodiments, the light profile shaping medium is configured to split or multiply the intrinsic intensity distribution into a plurality of distributions along at least one direction parallel to a major surface of the light profile shaping media. In some other embodiments, the light profile shaping medium is configured to broaden or diffuse the intensity distribution and to split the intensity distribution into a plurality of distributions. In still other embodiments, the light profile shaping medium is configured to broaden or diffuse the intensity distribution, while the retro-reflective display medium is configured to split the intensity distribution into a plurality of distributions.

In another aspect, a display screen configured to display images at a high viewing angle is provided. The display screen comprises a retro-reflective display medium configured to display an image by retro-reflectively reflecting light from a light source. The display screen additionally comprises a light bending medium interposed between the retro-reflective display medium and the light source, wherein the light bending medium is configured to substantially bend light passing therethrough, such that the display screen is configured to display the image retro-reflectively from the light source that is positioned at an angle of at least 15 degrees with respect to the a layer normal of the light bending medium.

In various embodiments, with respect to light incident on the display screen, the light bending medium is configured such that the incident light entering the light bending medium from the light source at a first angle with respect to a layer normal of the light bending medium is bent prior to entering the retro-reflective display medium at a second angle smaller than the first angle by at least 15 degrees with respect to the layer normal. With respect to light exiting the display screen, light reflected from the retro-reflective display medium at a third angle with respect to the layer normal is further bent prior to exiting the light bending medium at a fourth angle greater than the third angle by least 15 degrees with respect to the layer normal, prior to displaying the image to a viewer.

In another aspect, a display system comprises any of the display screens configured to display images using a shaped light profile described above. The display system additionally comprises a light source comprising a projector configured to direct the incident light towards the display screen having the retro-reflective display medium and the light profile shaping medium. The display system further includes a micro-processor in communication with the projector, wherein the micro-processor is programmed to control the first light source to direct the incident light towards the retroreflective display medium.

In another aspect, a method of displaying images using a shaped light profile comprises directing an incident light from a light source towards a stack including a retro-reflective display medium and a light profile shaping medium. The method additionally includes displaying an image by retro-reflectively reflecting the incident light, wherein displaying the image includes shaping an intensity distribution of light reflected from the retro-reflective display medium prior to displaying the image to a viewer.

In some embodiments, shaping the intensity distribution includes broadening and/or splitting the intensity distribution along at least one lateral direction parallel to a major surface of the display screen.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings, equations and description are to be regarded as illustrative in nature, and not as restrictive.

BRIEF DESCRIPTION OF THE DRAWINGS

The novel features of the invention are set forth with particularity. A better understanding of the features and advantages of the present invention will be obtained by reference to the following detailed description that sets forth illustrative embodiments, in which the principles of the invention are utilized, and the accompanying drawings (also "figure" and "FIG." herein), of which.

DETAILED DESCRIPTION

Figure 1:
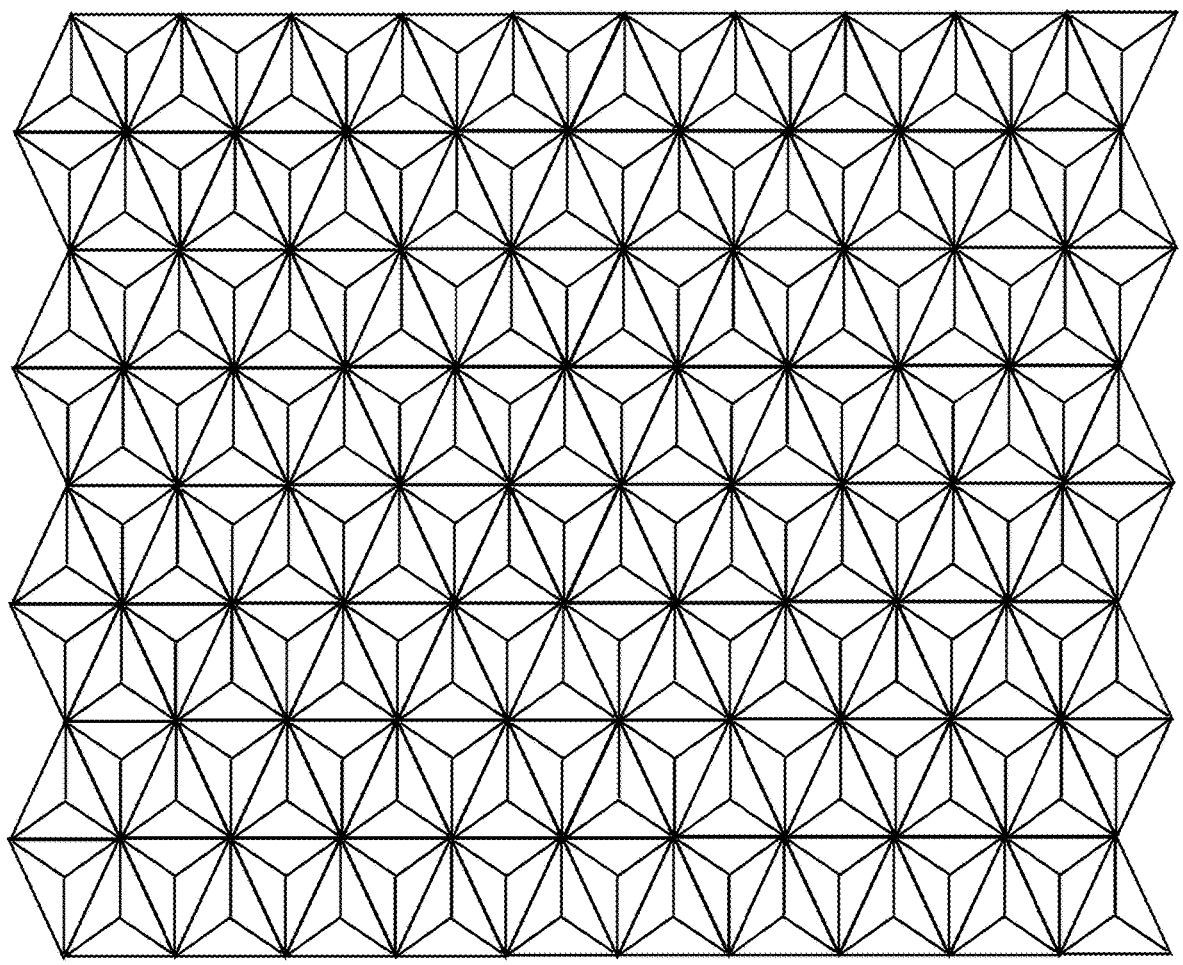
FIG. 1 schematically shows a magnified front view of a retro-reflective display medium, according to embodiments.

The present disclosure provides display systems and methods that address various limitations of other display systems and currently available. A display system of the present disclosure includes a projector and a display screen. The display screen includes a combination of various media or layers including a retro-reflective (RR) medium or a layer and one or more optically functional media or layer(s).

According to various embodiments, the retro-reflective display medium comprises retro-reflective elements that are configured to retro-reflectively reflect incident light into reflected light having an intrinsic spatial shape or profile having, e.g., an intrinsic intensity distribution. Without additional layers or media between the light source and the retro-reflective display medium to significantly change or alter the intrinsic spatial shape or profile, the viewer would see the intrinsic spatial shape or profile that is predominantly determined by retro-reflective elements of the retro-reflective display medium. However, for various applications, it may be desirable to alter the properties, e.g., shape or profile, of the light reflected by the RR medium, or to provide additional content thereto, without or in addition to modifying the retro-reflective elements of the retro-reflective medium.

To address this and other needs, the display screens according to embodiments include a retro-reflective (RR) display medium configured to display an image by retro-reflectively reflecting incident light from a light source. In addition to the RR display medium, the display screens include one or more optically functional media. The additional media, can provide various functionalities including, e.g., optimization or enhancement of the light reflected by the RR medium, and/or additional content independent of the content provided by the projector.

In some embodiments, the one or more optically functional media can include a light profile shaping medium configured to shape or alter the intensity profile of light passing therethrough. The light profile shaping medium is configured to be interposed between the retro-reflective display medium and the light source, and to shape an intensity distribution of light reflected from the retro-reflective display medium, prior to displaying the image to a viewer. In some embodiments, the light profile shaping medium is configured to broaden or diffuse the intrinsic intensity distribution along at least one direction parallel to a major surface of the light profile shaping medium. In some other embodiments, the light profile shaping medium is configured to split or multiply the intrinsic intensity distribution into a plurality of distributions along at least one direction parallel to a major surface of the light profile shaping media. In some other embodiments, the light profile shaping medium is configured to broaden or diffuse the intensity distribution and to split the intensity distribution into a plurality of distributions. In still other embodiments, the light profile shaping medium is configured to broaden or diffuse the intensity distribution, while the retro-reflective display medium is configured to split the intensity distribution into a plurality of distributions.

In some embodiments, the one or more optically functional media can include a light bending medium configured to be interposed between the retro-reflective display medium and the light source. The light bending medium is configured such that the incident light entering the light bending medium from the light source at a first angle to normal is bent prior to entering the retro-reflective display medium at a second angle smaller than the first angle. With respect to light exiting the display screen, light reflected from the retro-reflective display medium at a third angle to normal is further bent prior to exiting the light bending medium at a fourth angle greater than the third angle.

In some embodiments, the one or more optically functional media can include a secondary display medium configured to display content that is different and/or independent from the content provided by the projected light, such that the resulting display device is a hybrid RR display system. For example, systems of the present disclosure may provide a unique display such that multiple users are viewing the same screen with each viewer seeing their own content from the RR portion of the system while at the same time other viewers are seeing static or active media content from the non-RR portion of the system. As another example, a display system of the present disclosure can permit multiple viewers to view individual customized image or video streams on the same screen, while other viewers see a static poster or traditional digital television behind the screen surface. The present disclosure provides methods to optimize such RR-based display systems.

The present disclosure provides display systems utilizing a projector and a retro-reflective screen. Such display systems comprise a projector combined with a retro-reflective screen and a viewer distance from the projector such that an observation angle and/or a return angle is substantially small, in some cases less than approximately 20 degrees, 10 degrees, 5 degrees, 3 degrees, 2 degrees, or 1 degree.

The present disclosure provides systems and methods to engineer and optimize the physical and optical properties of light reflected by the RR display medium system such that the display properties are adapted for a particular purpose.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "retroreflective" (also "RR" or "retro-reflective" herein), as used herein, generally refers to an optical property of a device or a surface that reflects light back, e.g., towards the source of the light, with a relatively small amount light scattering. In a retroreflective screen, an electromagnetic wave is reflected back along a vector that is parallel to but opposite in direction from the source of the wave. A retroreflective screen comprises a retroreflective surface comprised of many small individual retroreflective (RR) elements. The RR elements may be based on a bead type optical element that is spherical in nature, or the RR element maybe based on corner cube reflective elements.

The term "corner cube reflective element," as used herein, generally refers to a reflective partial cube composed of three mutually perpendicular, nearly perpendicular, or angled flat reflective surfaces. With this geometry, incident light is reflected back directly towards the source. The configuration of a corner cube reflective element may comprise elements containing only triangular shaped surfaces or may comprise elements containing portions of triangular shaped surfaces, or may comprise surface that are polygon in nature in order to maximize the percentage of photons that undergo 3 reflections. The latter type of element is sometimes described as "full-cube" structures. In some cases, the angles between the surface normal vectors for the 3 surfaces comprising each corner cube element are exactly 90 degrees. In other cases, the angles between the 3 surface normal vectors deviate from exactly 90 degrees in order to optimize the retro-reflected light profile as described in U.S. Patent Application Ser. No. 61/997,206, the content of which is incorporated herein in its entirety.

The term "projector," as used herein, generally refers to a system or device that is configured to project (or direct) light. The projected light can project an image and/or video.

The term "observation angle," as used herein, generally refers to an angle between a first line directed from a light source, e.g., a projector for retro-reflective display media, to a given location on a screen and a second line from that same location on the screen to one or more eyes of a viewer.

For retro-reflective display media, a range of observation angles can be described as a range of angles centered around the second line, outside of which the luminance or intensity of the image reflected from the screen falls off by, e.g., more than 30%, 50%, 70% or 90%, whose value can be relatively small. For display screens having a secondary display medium but not a light profile shaping medium, the range of observation angles can be, e.g., less than about 20 degrees, less than about 10 degrees, less than about 5 degrees, less than about 3 degrees, less than about 2 degrees, or less than about 1 degree, or a value within a range defined by any of these values. The skilled artisan will appreciate that the above confined angles for viewing represent the retro-reflective display media alone, and that the viewing angle can be significantly widened by embodiments described below that include light profile shaping media.

In some display screens in which the one or more optically functional media includes a secondary display medium configured to display content that is different and/or independent from the content provided by the projected light, the secondary media can be reflective but not retro-reflective, such as, e.g., secondary media comprising a mirror or a static content layer. In these display screens, the light source may be external light other than that from the projector, and the range of observation angles are relatively large, e.g., greater than about 60 degrees, greater than about 90 degrees, greater than about 120 degrees, greater than about 150 degrees or greater than about 170 degrees.

In some display screens in which the one or more optically functional media includes a secondary display medium configured to display content that is different and/or independent from the content provided by the projected light, the secondary media can be non-reflective display media such as, e.g., secondary media comprising an active content layer. In these display screens, since the image is formed is not a reflective image, a range of observation angles can be described as a range of angles centered around a line normal to the display media, outside of which the contrast ratio falls off by, e.g., more than 30%, 50%, 70% or 90%, whose value can be e.g., greater than about 60 degrees, greater than about 90 degrees, greater than about 120 degrees, greater than about 150 degrees or greater than about 170 degrees, depending on the type of active content layer. For example, light emitting diode (LED) displays and organic light emitting diode (OLED) displays may have higher ranges of observation angles, while liquid crystal displays (LCDs) may have lower ranges of observation angles.

The term "return angle," as used herein, generally refers to the angle between an incident beam of light and a reflected beam of light from a screen. For a typical surface, the return angle has a broad range of values. For a retroreflective medium without the light profile shaping media as described herein, the return angle typically has a very small spread of angles centered around zero.

The term "incidence angle," or sometimes referred to as "entrance angle" as used herein, generally refers to an angle between a first line directed from a projector to a given location on a screen and a second line that is normal to the nominal front surface of the corner cube. The nominal front surface of the corner cube is defined as the surface perpendicular to and intersecting the mid-point of a line from the corner of the corner cube structure to the hypothetical opposite corner of the cube if the corner cube were to have been a full cube.

The term "optical cross-talk" (also "cross-talk" herein), as used herein, generally refers to retro-reflected light from a projector that reaches a viewer (or eye of a viewer) that was not intended to receive the light. This can result in a poor 3D viewing experience exhibited by "ghosting" which is a term used herein to describe double images seen by viewers where only one image is intended. The term "perceived cross-talk" as used herein, generally refers to the ratio of the intensity of undesired retro-reflected light from a projector that reaches a viewer (or eye of a viewer) relative to the intensity of desired retro-reflected light. There may be scenarios where absolute cross-talk intensity has decreased, but the intensity of desired light has decreased by an even larger amount, resulting in worsening in perceived cross-talk.

The present disclosure provides a display system that permits multiple viewers to simultaneously view individual customized content such as but not limited to video, photos, games, advertisements or productivity software simultaneously on the same screen. Additionally, the present disclosure provides a method to enable other viewers to observe objects or content in front of or behind or interleaved with the RR portion of the display system. The display system can comprise a projector combined with various optically opaque, transparent, perforated or semi-transparent layers combined with a RR layer.

Retro-Reflector Display Systems

In an aspect, a display system comprises a retro-reflective screen having retro-reflective screen elements that reflect light along a direction that is substantially non-parallel to the direction of propagation of the light. Each of the retro-reflective screen elements comprises at least three intersecting planes (e.g., in the form of a pyramidal structure or truncated pyramidal or non-triangular faced structures sometimes referred to as full-cube structures). At least one of the three intersecting planes can intersect an adjacent plane (e.g., of the same retro-reflective screen element) at an angle that is 90 degrees with an offset greater than 0 degrees. The system further comprises at least one projector that projects the light onto the retro-reflective layer, which light characterizes an image or video. The retro-reflective layer can include truncated or full corner cube reflectors. In some cases, the system comprises multiple projectors. For example, the system can include two projectors that provide a stereoscopic image or video for 3D viewing. For example, the image or video is rendered by more than one projector such that, upon reflection by the retro-reflective screen, the image or video is three-dimensional.

The projector can be mountable on a body of a viewer. In some examples, the projector is mountable on a head of the viewer. The projector can be mountable with a support member, such as body or head support member (e.g., support strap(s)). The projector can also be mounted at a fixed location, independent of the viewer such that a viewer may enter the range of the projector. The projector can also be mounted on a movable mount such that the project can move with or follow an intended viewer. The projector system can also be comprised of multiple projectors in close proximity in order to increase the viewing area for a given viewing location.

The display system can include a sound system for providing sound to complement the image or video. The sound can go along with a viewer's viewing experience, such as by way of headphones or other local speaker system. The sound system may be a directed sound system such that the sound has high intensity at a desired location in comparison to other locations.

The display system can include a system for tracking the location of the users as well as the direction the users are facing as well as the direction that the users are looking. This tracking systems can be done using a variety of techniques, including, but not limited to: accelerometers, gyroscopes, electro-magnetic signal detection, visible light or infra-red lighting and cameras, or body mounted markers combined with cameras.

The retro-reflective screen can have various sizes and configurations. The screen can be substantially flat or curved. The curvature of the screen can be either convex or concave with respect to the viewer. The screen can have a width of at least about 1 meter (m), 10 m, or 50 m, and a height of at least about 0.5 m, 10 m or 50 m. The screen can also have a shape that is not rectangular. In large area settings, a large area display can be effective for advertising purposes, or other showcase demonstrations, due, at least in part, to the qualities of the display size and having multiple images/videos on the same screen area. The retro-reflective screen can also be non-stationary.

Reference will now be made to the figures. It will be appreciated that the figures and features therein are not necessarily drawn to scale.

FIG. 1 shows a front view of a representative retro-reflective medium for a retro-reflective screen. The retro-reflective medium is comprised of an array of truncated corner cube reflectors. The corner cube reflectors may also be comprised of alternative geometries. Examples of corner cube reflectors are provided in U.S. Pat. No. 5,763,049 to Frey et al. and U.S. Pat. No. 7,261,424 to Smith, which patents are entirely incorporated herein by reference. In some embodiments, the size of each of the corner cube reflectors is smaller than the anticipated or predicted pixel size of the projected image, with the pixel size determined by the combination of the projector display system and the distance of the projector from the retroreflective screen.

Figure 2:
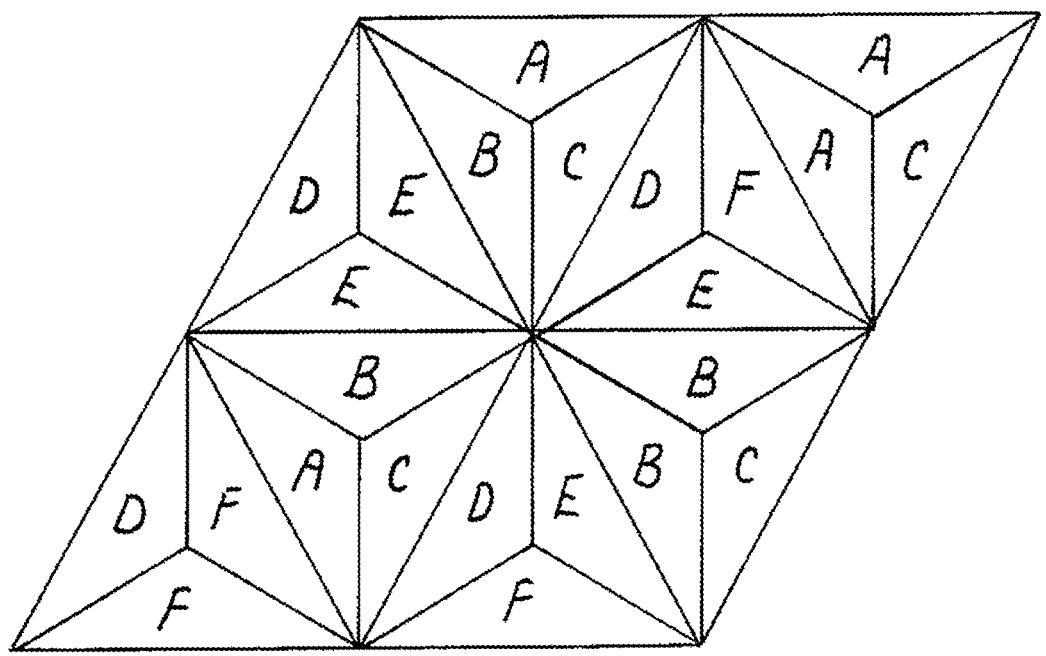
FIG. 2 schematically illustrates a retro-reflective display medium with retro-reflective screen elements having intersecting planes, according to embodiments.

A retroreflective medium for a retroreflective screen can include retroreflective screen elements having intersecting planes. This is schematically illustrated in FIG. 2, which shows pyramidal retroreflective screen elements with intersecting planes A-F. Planes of adjacent elements may intersect one another at an angle that is 90 degrees. For example, Planes B and C at the bottom left-hand portion of the schematic intersect at an angle of 90 degrees. In some cases, at least one of three intersecting planes can intersect an adjacent plane (e.g., of the same retroreflective screen element) at an angle that is 90 degrees with an offset greater than 0 degrees. For example, the D plane at the bottom left-hand portion of FIG. 2 can intersect the E plane at an angle that is 90 degrees with an offset greater than 0 degrees.

Figure 3:
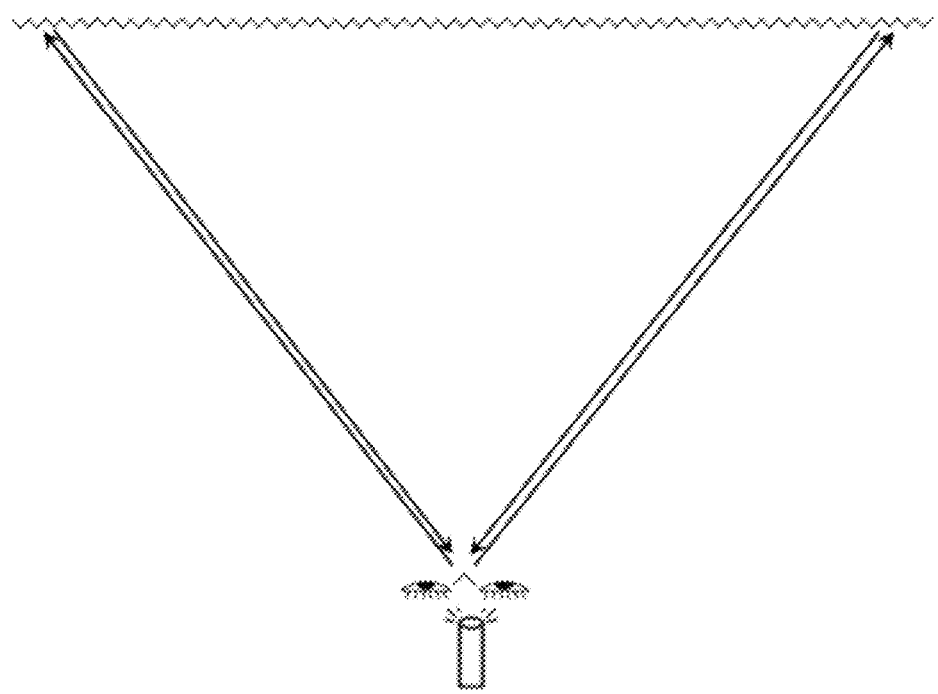
FIG. 3 schematically shows a top view of a display system including a retro-reflective display medium and projector with the viewer facing the screen, according to embodiments.

FIG. 3 shows a schematic top view of a system having a projector and a retroreflective screen. The retroreflective properties of the screen cause a majority of the light incident upon the screen to be reflected back towards the projector in a tight directional cone of light regardless of the incident angle. This is in contrast to some conventional screens which scatter incident light in a relatively isotropic manner. In such a conventional screen set up, a relatively very small fraction of the light incident on the screen impinges upon the viewer's eyes. Because of the retroreflective effect with this type of system, if the viewer's eye(s) is in close proximity to the projector such that the angle defined by the path from the projector to the reflective screen and returning to the viewer's eye is small, then the brightness of the image may be increased significantly over a conventional projector and reflective screen set up. The system of FIG. 3 in some cases does not have a beam splitter. In cases incorporating methods described in U.S. Patent Application Ser. No. 61/997, 206 the viewer and/or the viewer's eye(s) may be at an observation angle that is significantly larger than in scenarios not incorporating these methods.

In the following, various embodiments of a display screen configured to display images that depend upon the viewing position are described. In various embodiments, the display screen comprises a retroreflective display medium configured to display a primary image by reflecting incident light from a first light source towards a first viewing position. The display screen additionally may include a secondary display medium configured to display a secondary image. The retroreflective display medium and the secondary medium can be stacked in a display depth direction and are laterally overlapping in a lateral direction perpendicular to the depth direction. The display screen additionally may include additional layer(s) with optical properties selected and engineered to optimize overall system performance.

Figure 4:
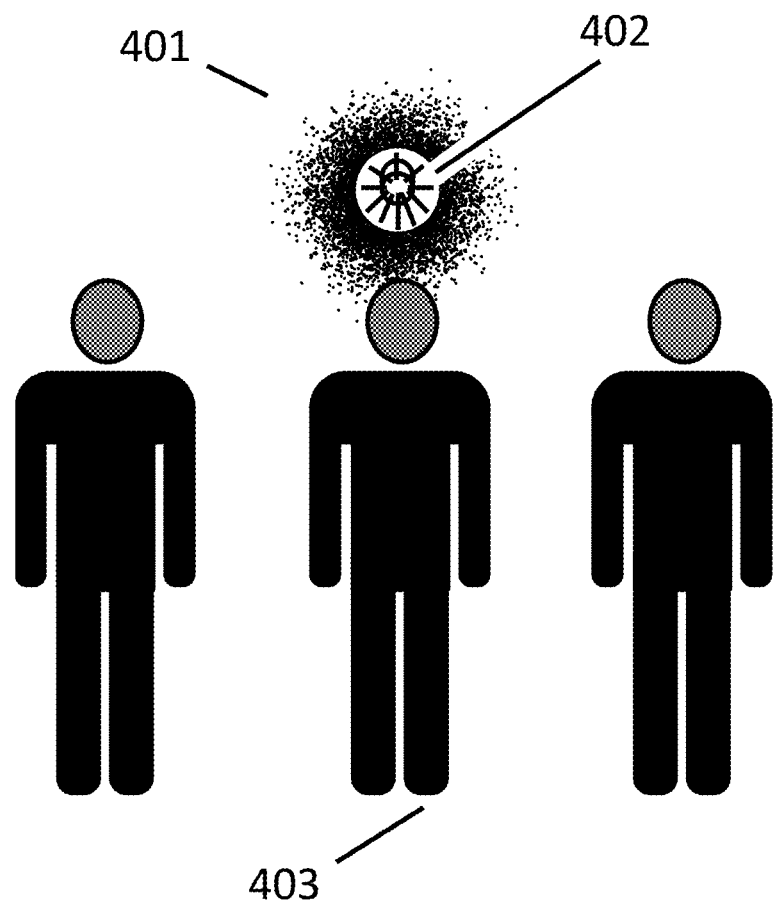
FIG. 4 schematically shows the retro-reflected light intensity profile relative to representative viewers.

FIG. 4 schematically shows the retro-reflected light intensity profile relative to representative viewers for a retroreflective display system that does not incorporate methods described in U.S. Patent Application Ser. No. 61/997,206 or the embodiments described herein. In this figure, the pattern of retro-reflected light 401 is centered around the projector or image source 402. The primary viewer 403 who is in the proximity of the projector 402 will see the retro-reflected image, however, depending on the system layout and the viewer's distance from the source, the image intensity may vary significantly. For example, in FIG. 4, the head of viewer 403 is schematically shown as outside of the region of high retro-reflected intensity and in the region of rapid intensity variation. This results in low image intensity reaching the viewer's eyes, as well as large variation in intensity with relative small movements of viewer 403. Both of these effects may have a potential negative impact to the viewing experience. U.S. Patent Application Ser. No. 61/997,206, describes methods to engineer retroreflective optical elements of the retroreflective display medium in a display device in order to optimize the retro-reflected light patterns, or the retro-reflected light distributions, for different display system configurations. However, making such modifications to the optical elements of the retroreflective display medium may be costly and time consuming to implement, especially if multiple configurations are desired. Accordingly, described herein are methods to engineer the overall system return light pattern, or the retro-reflected light distribution, without modifying the retroreflective optical elements or in conjunction with modifications to the RR optical elements, according to various embodiments.

Retroreflective Display Screens Configured to Display Images Using a Shaped Light Profile In the following, with respect to FIGS. 5 and 6, retroreflective display screens configured to display images using a shaped light profile are described, in accordance with embodiments. The display screens include retroreflective display media 501 (FIG. 5), 601 (FIG. 6) configured to display an image via retroreflective reflection of incident light from a light source into reflected light. The display screens additionally include light profile shaping media 504, 602 formed over the retroreflective display media 501, 601 and configured to shape or change an intensity distribution of the reflected light from the retroreflective display media 504, 602 passing therethrough, prior to displaying the image to a viewer. In some embodiments, shaping or changing the intensity distribution comprises broadening or diffusing the intensity distribution along at least one direction parallel to a major surface of the light profile shaping media 504, 602. In some embodiments, shaping or changing the intensity distribution comprises splitting the intensity distribution into a plurality of distributions along at least one direction parallel to a major surface of the light profile shaping media 504, 602. In some embodiments, shaping or changing the intensity distribution comprises a combination of broadening/diffusing the intensity distribution and splitting the intensity distribution into a plurality of distributions along at least one direction parallel to a major surface of the light profile shaping media 504, 602.

In some embodiments, the light profile shaping medium comprises a light diffusing layer comprising a plurality of protrusions serving as lenslets. In some embodiments, the protrusions can be arranged to face away from the retroreflective display media 501, 601, and can be randomly oriented to produce, e.g., circular symmetric light distributions. In some other embodiments, the protrusions can be pseudo-randomly oriented to produce, e.g., asymmetric light distributions including elliptical distributions. For example, the protrusions may have a texture or may be preferentially elongated in one direction. In some embodiments, the light profile shaping medium comprises protrusions that are periodically arranged along at least one direction (e.g., horizontal or vertical) that is parallel to a major surface of the light profile shaping medium.

Figure 5:
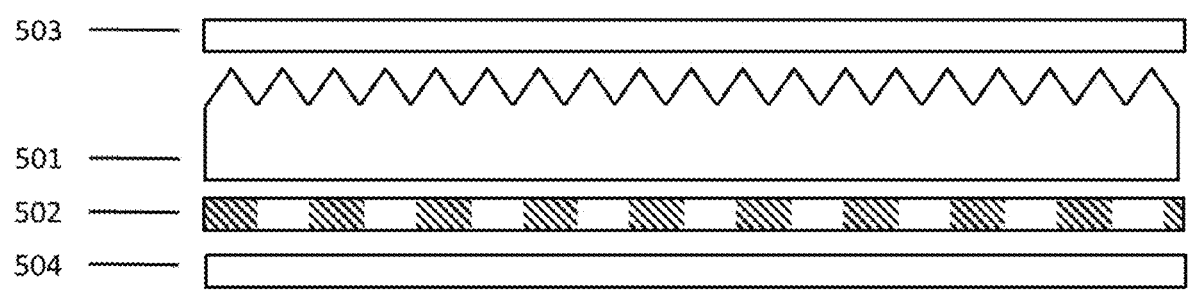
FIG. 5 schematically shows a cross-sectional view of an illustrative screen portion of a retro-reflective display system comprising a retro-reflective medium, a light profile shaping medium and a secondary display medium, according to embodiments.

FIG. 5 schematically shows a cross-sectional view of a display screen of a retroreflective display system, according to embodiments. In these embodiments, the display screen includes a retroreflective medium 501 having a plurality of retroreflective elements, as described above with respect to FIGS. 1 and 2. In addition, the display screen includes one or more optically functional media. The one or more optically functional media includes one or both of a light profile shaping medium 504 or an optical modulating layer and a secondary display medium 502.

As described herein, a primary image refers to an image which is formed, e.g., primarily formed, by the retroreflective medium 501 via retroreflection from of light from a light source, e.g., a projector. A secondary image refers to an image which may be formed, e.g., primarily formed, by the secondary display medium 502 and not by retroreflection. It will be appreciated that the primary and secondary images may be formed independent of one another. That is, the presence of the secondary image can be independent of the light source causing the primary image, and the presence of the primary image can be independent of the light source causing the secondary image.

Still referring to FIG. 5, the illustrated display screen is configured such that the primary image is visible from the first viewing position within a first range of observation angles. In some configurations, there may be a secondary display medium 502 configured such that the secondary image is visible from a second viewing position within a second range of observation angles substantially greater than the first range of return angles and including the first range of return angles. In embodiments, the first range of observation angles is centered about a direction of reflection of the incident light towards the first viewing position can be is less than about 20 degrees if one or more methods described in U.S. Patent Application Ser. No. 61/997,206 (whose content is incorporated by reference herein in its entirety) are utilized, or less than about 2 degrees if the methods are not utilized. As described herein, the luminance of the primary image falls off by more than about 50% outside the first range of observation angles. In embodiments, the luminance of the secondary image is less than about 10% relative to a luminance of the primary image within the first range of observation angles when the primary image is present. In embodiments, a luminance of the secondary image is less than about 25% of a luminance of the primary image within the first range of observation angles when the primary image is present. In embodiments, one or both of the retroreflective display medium and the secondary display medium comprise a partially transparent layer having local regions that are modified, e.g., at least partially perforated, to have increased transparency relative to remaining regions.

Still referring to FIG. 5, the illustrated display screen comprises a retroreflective display medium 501 configured to display a primary image by reflecting incident light from a first light source towards a first viewing position. The secondary content medium 502 is configured to display a secondary image. The retroreflective display medium 501 and the secondary medium 502 are stacked in a display depth direction and laterally overlap. The retroreflective display medium 501 and the secondary content medium 502 can be arranged according to various embodiments described in U.S. Provisional Patent Application Ser. No 62/433,396, filed Dec. 13, 2016, the content of which is incorporated herein in its entirety.

Still referring to FIG. 5, the illustrated display screen can represent an example of a hybrid RR static-overlay display, which includes a secondary display medium 502 in the form of a perforated static overlay and a light profile shaping medium or an optical modulating layer 504. The retroreflective display medium 501 represents the primary retroreflective layer. The secondary display medium 502 can be a layer or object that is showing static content such as a poster, picture, painting or other such static content, which can serve to provide a secondary image as described above. In some embodiments, the secondary display medium 502 can be "perforated," at least partially, in order to allow a desired percentage of light to pass through 502 in with no reflection or absorption. The display screen additionally includes a support layer 503 that is configured to provide a rigid support for the other layers. This layer may help the overall system to be flat or it may be curved or it may be segmented at different angles to emulate a curved shape for the overall screen portion of the display system. The light profile shaping medium or the optical modulating layer 504 represents a layer that optically modulates light passing through the secondary display medium 502. In various embodiments, the light profile shaping medium 504 can be, for example, a light-diffusing and/or a light-splitting layer. There are many other configurations and layers that may be used in tandem with the retroreflective layer 501. In some cases, layer 502 is not used, and in other scenarios other layers are incorporated.

Still referring to FIG. 5, other embodiments are possible, where the display screen is a hybrid RR dynamic-overlay display which includes a secondary display medium 502 in the form of a dynamic overlay, as described in more detail in U.S. Provisional Patent Application Ser. No 62/433,396, filed Dec. 13, 2016, and a light profile shaping medium or an optical modulating layer 504.

Figure 6:
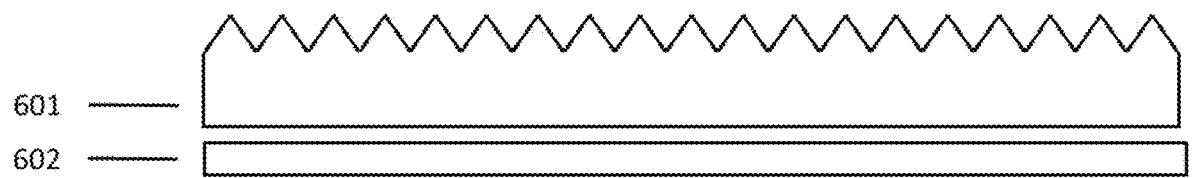
FIG. 6 schematically shows a cross-sectional view of an illustrative screen portion of a retro-reflective display comprising a retro-reflective medium and a light profile shaping medium according to embodiments.

FIG. 6 schematically illustrates a cross-sectional view of an illustrative screen portion of a retroreflective display system utilizing an optical modulating layer. The display screen includes an RR medium 601, which can be the primary retroreflective layer. The light profile shaping medium 602, similar to the light profile shaping medium 504 (FIG. 5), represents a layer that optically modulates light passing therethrough. The optical properties of the light profile shaping medium 602 (or 504 in FIG. 5) may be engineered using many different methods in order to provide the desired system level retro-reflected light profiles. No secondary display medium or rigid support layers are present in the illustrated embodiment, although one or both may be included in other embodiments, as described above with respect to FIG. 5.

In some embodiments, the light profile shaping medium 602 (or 504 in FIG. 5) may be configured as a simple radially symmetric diffuser layer which spreads light passing through the layer in a radially symmetric manner. This is the most common form of diffuser layer and can be manufactured in many different fashions and with a range of different diffusion angles. The amount of diffusion may also be characterized by different parameters. One representative metric is amount of light transmission and angle of diffusion or spreading of light. For retroreflective display applications, a high value for light transmission typically greater than 80% or greater than 90% is desirable. The angle of light spreading will depend on the specific display system application and could range from less than 1 degree to less than 3, 5, 10 or 20 degrees, or have a value in a range defined by any two of these values. The angle of spreading can be based, e.g., on a full width at half maximum of a displayed intensity distribution, such that the full width at half maximum (FWHM) of the displayed intensity distribution can be less than 1, 3, 5, 10 or 20 degrees, or can be within a range defined by any of these values, when measured in at least one radial direction from a center of the displayed intensity distribution.

In some other embodiments, the light profile shaping medium 602 (or 504 in FIG. 5) is configured to split or multiply the intrinsic intensity distribution into a plurality of distributions along at least one direction parallel to a major surface of the light profile shaping media. In these embodiments, the light profile shaping medium 602 (or 504 in FIG. 5) may be formed of a film that includes a prismatic structure on at least one side.

In some other embodiments, the light profile shaping medium 602 (or 504 in FIG. 5) is configured to broaden or diffuse the intensity distribution and/or to split the intensity distribution into a plurality of distributions. In these embodiments, the light profile shaping medium 602 (or 504 in FIG. 5) may be formed of a film having a prismatic structure on one side while having light shaping structures, e.g., protrusions serving as lenslets described elsewhere in this application, on the other side. Other arrangements are possible, e.g., the light profile shaping medium 602 (or 504 in FIG. 5) may include separate films for the prismatic structure and light shaping structures, e.g., protrusions.

It will be appreciated that in various embodiments, the light profile shaping medium 504 (FIG. 5), 602 (FIG. 6) is configured to alter the profile or distribution of light intensity each time it passes therethrough. Thus, the light intensity profile that is shaped by the light profile shaping medium 504, 602, described below, represents a net light intensity profile resulting from passing through the light profile shaping medium 504, 602 twice.

Figure 7:
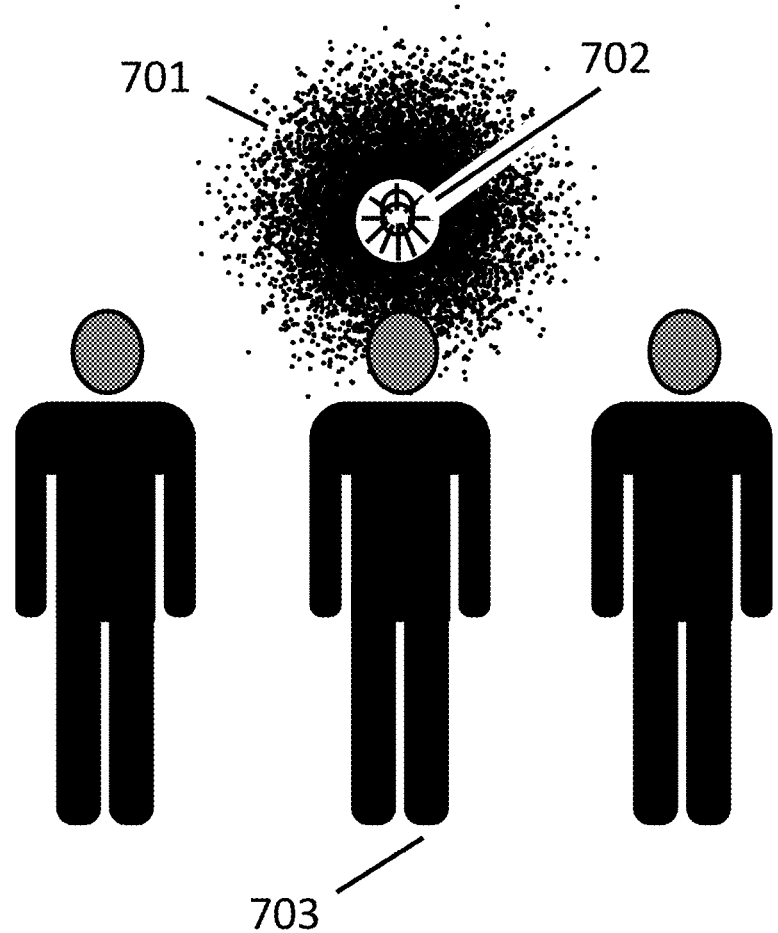
FIG. 7 schematically shows a retro-reflected light intensity profile generated from a display system comprising a retro-reflective medium and a light profile shaping medium comprising a diffuser layer relative to representative viewers, according to embodiments.

FIG. 7 schematically shows the retro-reflected light intensity profile generated by a display screen comprising a light profile shaping medium 504 (FIG. 5), 602 (FIG. 6) in the form of a simple radially symmetric diffuser layer relative to representative viewers. In this embodiment, the pattern of retro-reflected light 701 is centered around the projector or image source 702 or an incident path or a return path of light emitted by the light source 702. The primary viewer 703 is in the proximity of the projector 702 and will see the retro-reflected content. The retro-reflected light profile has a larger angular spread compared to that shown in FIG. 4 due to the diffusive optical characteristics of the light profile shaping medium 504 (FIG. 5), 602 (FIG. 6). The head of viewer 703 is therefore closer to the higher intensity region of the retro-reflected light profile compared to the scenario shown in FIG. 4. An additional key benefit of a diffusive layer used in this manner is that spatial variations in retroreflective properties of the retroreflective screen due to manufacturing variation will be more diffused, which will result in significantly improved within-screen uniformity.

In the illustrated embodiment, the displayed intensity distribution of the retro-reflected light 701 is radially symmetric. However, the disclosure herein is not so limited and, in other embodiments, the displayed intensity distribution is radially asymmetric, as described below with respect to other embodiments.

Still referring to FIG. 7, in the illustrated embodiment, the displayed intensity distribution of the retro-reflected light 701 is centered about an incident light path of the incident light represented by the projector or image source 702. However, the disclosure herein is not so limited and, in other embodiments, the displayed intensity distribution of the retro-reflected light 701 is centered away from an incident light path of the incident light represented by the projector or image source 702.

Figure 8:
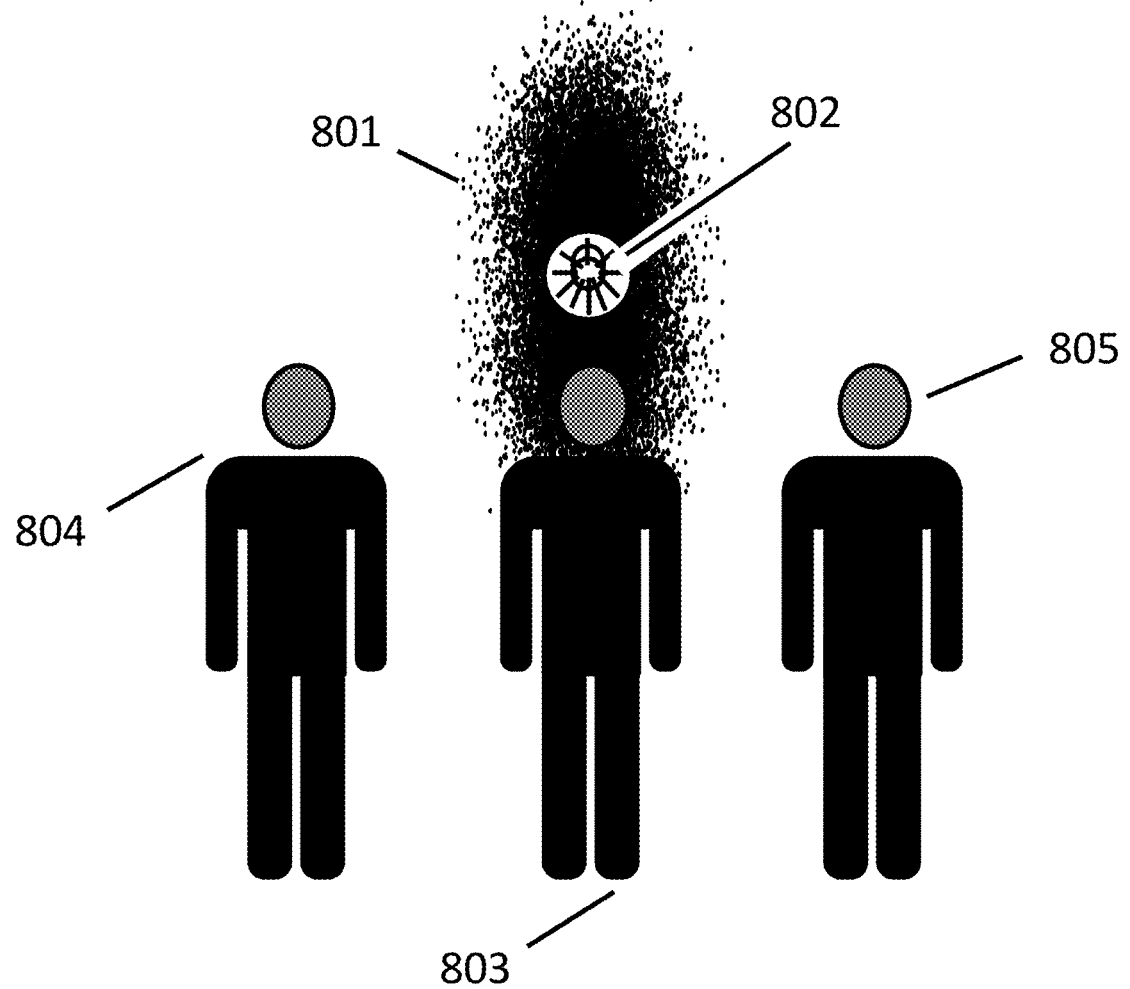
FIG. 8 schematically shows a retro-reflected light intensity profile generated from a display system comprising a retro-reflective medium and a light profile shaping medium comprising a an asymmetric diffuser layer, according to embodiments.

FIG. 8 schematically shows the retro-reflected light intensity profile for a retroreflective display system incorporating a light profile shaping medium 504 (FIG. 5), 602 (FIG. 6) in the form of an asymmetric diffuser layer. In this configuration, a diffusive layer with an elliptical optical diffusion property is used for the light profile shaping medium 504 (FIG. 5), 602 (FIG. 6). The spread in the light pattern is large in one direction and smaller or negligible in other directions. Advantages of this embodiment includes the fact the primary viewer 802 will be well within the high intensity region of the retro-reflected light pattern within a larger range of vertical viewing positions and/or will observe much less variation in image intensity with variations in vertical distance relative to the projector source. As a result, the primary viewer 802 can have different heights and/or be at different horizontal distances from the projector source without experiencing substantial degradation in the observed image. An additional benefit is that, because the light intensity distribution in the lateral direction is not increased, the viewers 804 and 805, who are not supposed to be able to observe content from source 802 are kept well outside of the retro-reflected light pattern 802.

In various embodiments, the displayed intensity distribution has a ratio between a first FWHM measured in a first lateral direction along a first lateral direction parallel to the major surface of the light profile shaping medium, and a second FWHM measured in a second lateral direction orthogonal to the first lateral direction that is greater than about 2, 5, 10 or 20. For example, when the FWHM measured in the first lateral direction is about 1 degree, the corresponding FWHM measured in the second lateral direction can be greater than about 2, 5, 10 or 20 degrees.

Elliptical optical diffusers as shown in FIG. 8 may be manufactured in a number of different manners. For example, Luminit (www.luminitco.com) manufactures and sells Light Shaping Diffusers® (LSDs®) that spread light symmetrically or asymmetrically. More information on these LSD products can be found at (http://www.luminitco.com/products/light-shaping-diffusers, whose content downloaded on Mar. 3, 2017, is incorporated herein in its entirety). Example products include 60 degree×1 degree diffusers, 15 degree×1 degree diffusers, 10 degree×1 degree diffusers and 5 degree×1 degree diffusers. This notation indicates that light is spread by 60 degrees in one direction and 1 degree in the orthogonal direction with the angle as measure by the intensity full-width-half-maximum (FWHM). The manufacture of the LSDs describes them as "surface relief structures that are replicated from a holographically-recorded master." "These pseudo-random, non-periodic structures can manipulate light by changing the direction of its energy. The result is the elimination of Moiré, color over-angle, and precise angular beam control." Scanning electron microscope images on the Luminit website show profiles with elongated pseudo random surface structures. As described herein, pseudo-random structures of a medium or a layer can be non-periodic in at least one lateral direction or axis parallel to a major surface of the medium or the layer. Additionally or alternatively, the pseudo-random structures can have a shape or a form that has at least one structural factor that has a preference in at least one lateral direction or axis parallel or perpendicular to a major surface of the medium or the layer. Structural factors having a preference can be any structural factor that affects the light diffusing properties of the medium or the layer, including lateral dimensions or surface orientations. For example, in some implementations, the pseudo-random structures can be non-periodic in any lateral axis parallel to a major surface of the medium or the layer, while being elongated in a major lateral direction.

The aforementioned product and structure form Luminit is just one example of a method that can be used to obtain an asymmetric diffusion profile. Instead of a pseudo random structure, a regular ordered array of lenslets or optical elements may also be used to achieve an asymmetric light intensity diffusion profile. For example, the regular ordered array may regularly arranged lenslets having different periodicities in different directions to produce the asymmetric light intensity profile. For example, Film Optics Ltd. (www.film-optics.co.uk) sells lenticular diffusers that use lens structures with pitch and radius values in the range of <100 microns that may also be used to spread light asymmetrically. More details can be found at www.film-optics.co.uk/images/datasheets/LF279250PC%20Product%20Data%20Sheet.pdf, whose content downloaded on Mar. 3, 2017, is incorporated herein in its entirety. Different values for the structures may be used to achieve the desired optical properties.

While in the illustrated embodiment, the displayed intensity distribution is elongated in a vertical direction, other embodiments are possible, where the displayed intensity distribution is elongated in a horizontal direction, or in an angled direction between the horizontal direction and the vertical direction. The different directions of elongation are apparent in the plane of the display screen and/or parallel to a major surface of the light profile shaping medium.

Figure 9:
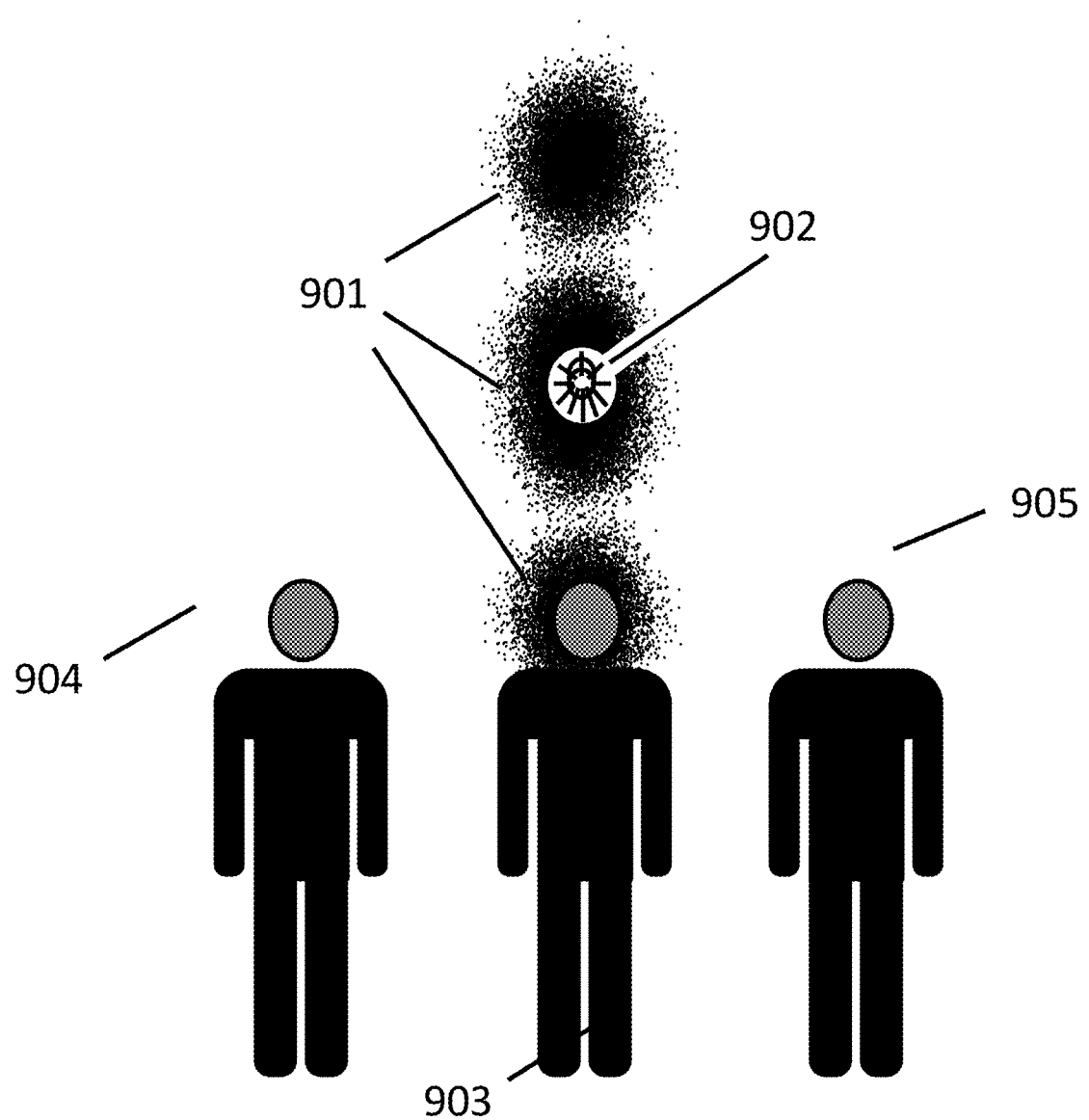
FIG. 9 schematically shows the retro-reflected light intensity profile for a retro-reflective display system incorporating an optical splitting layer.

FIG. 9 schematically shows the retro-reflected light intensity profile for a retroreflective display system incorporating light splitting properties for the light profile shaping medium 504 (FIG. 5), 602 (FIG. 6). As described above, the splitting of the light passing through the light profile shaping medium 504, 602 may be achieved, e.g., by a prismatic structure formed on the light profile shaping medium 504, 602. With this configuration, the light profile shaping medium 504, 602 splits the incoming and outgoing light vertically. The resulting return profile comprises a plurality of intensity distributions or regions 901. In the illustrated embodiment, the return profile has four distributions from passing through the light profile shaping medium 504, 602 twice, in which the two middle distributions overlap. Relative to the profile shown in FIG. 4, this allows the primary viewer 903 to be more centered within a region of high retro-reflected intensity, while also allowing a larger separation (angularly or vertically) between the source/projector 902 and the viewer 903. Alternative configurations for this include reorientation of the light profile shaping medium 504, 602 by 90 degrees in order to split the retro-reflected light horizontally or reorientation of the light profile shaping medium 504, 602 by 45 degrees in order to enable height-dependent viewing locations or for example to enable viewing locations along a stair way or escalator. The above as well as the descriptions below are representative only and configurations are not limited to these specific configurations.

Still referring to FIG. 9, in some embodiments, the plurality of intensity distributions 901 can also be broadened distributions, either symmetrically or asymmetrically. In some embodiments, broadening of the light intensity distributions may be achieved using the light profile shaping medium 504, 602 and/or the retroreflective elements of the retroreflective medium 601.

Figure 10:
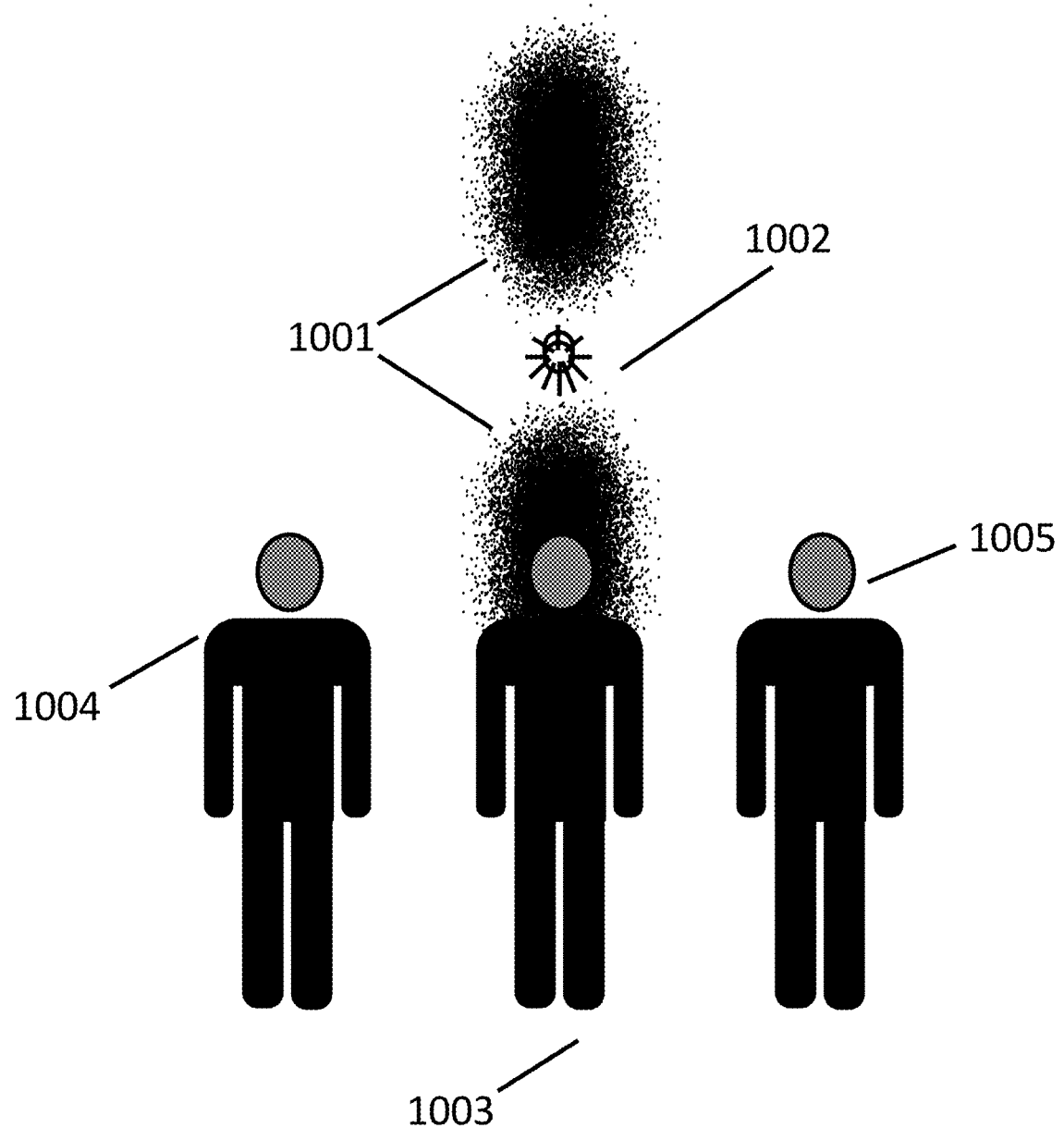
FIG. 10 schematically shows the retro-reflected light intensity profile for a retro-reflective display system incorporating a split retro-reflective return profile combined with a layer with an asymmetric diffusing property.

FIG. 10 schematically shows the retro-reflected light intensity profile for a retroreflective display system incorporating a split and asymmetrically diffused retro-retroreflective return profile 1001, achieved using a combination of retroreflective medium 601 comprising light-splitting retroreflective elements and a light profile shaping medium 504 (FIG. 5), 602 (FIG. 6) comprising a layer with an asymmetric diffusing property. For this configuration, the retroreflective optical elements of the retroreflective medium are engineered to provide a split return profile as outlined in U.S. Patent Application Ser. No. 61/997,206, the content of which is incorporated herein in its entirety. Additionally, the light profile shaping medium 504, 602 is designed to have an asymmetric diffusion profile with a larger amount of diffusion in the nominal vertical direction versus less or minimal diffusion in the horizontal direction. The resulting retro-reflected profile 1001 has the advantageous characteristics including: a) relative large vertical spread so the primary viewer 1003 is within the high intensity retro-reflected region for a range of user heights without requiring adjustment of the projector source 1002 to head distance, b) minimal horizontal spread so that viewers 1004 and 1005 do not see the retro-reflected content, thereby enabling viewer 1003 to privately view his or her content and c) a large angular offset between the projector source 1002 and the primary viewer, among other characteristics.

Still referring to FIG. 10, alternative display arrangements can be used to achieve similar results. For example, broadening of the light intensity distributions may be achieved using or additionally using the retroreflective elements of the retroreflective medium 601.

Figure 11:
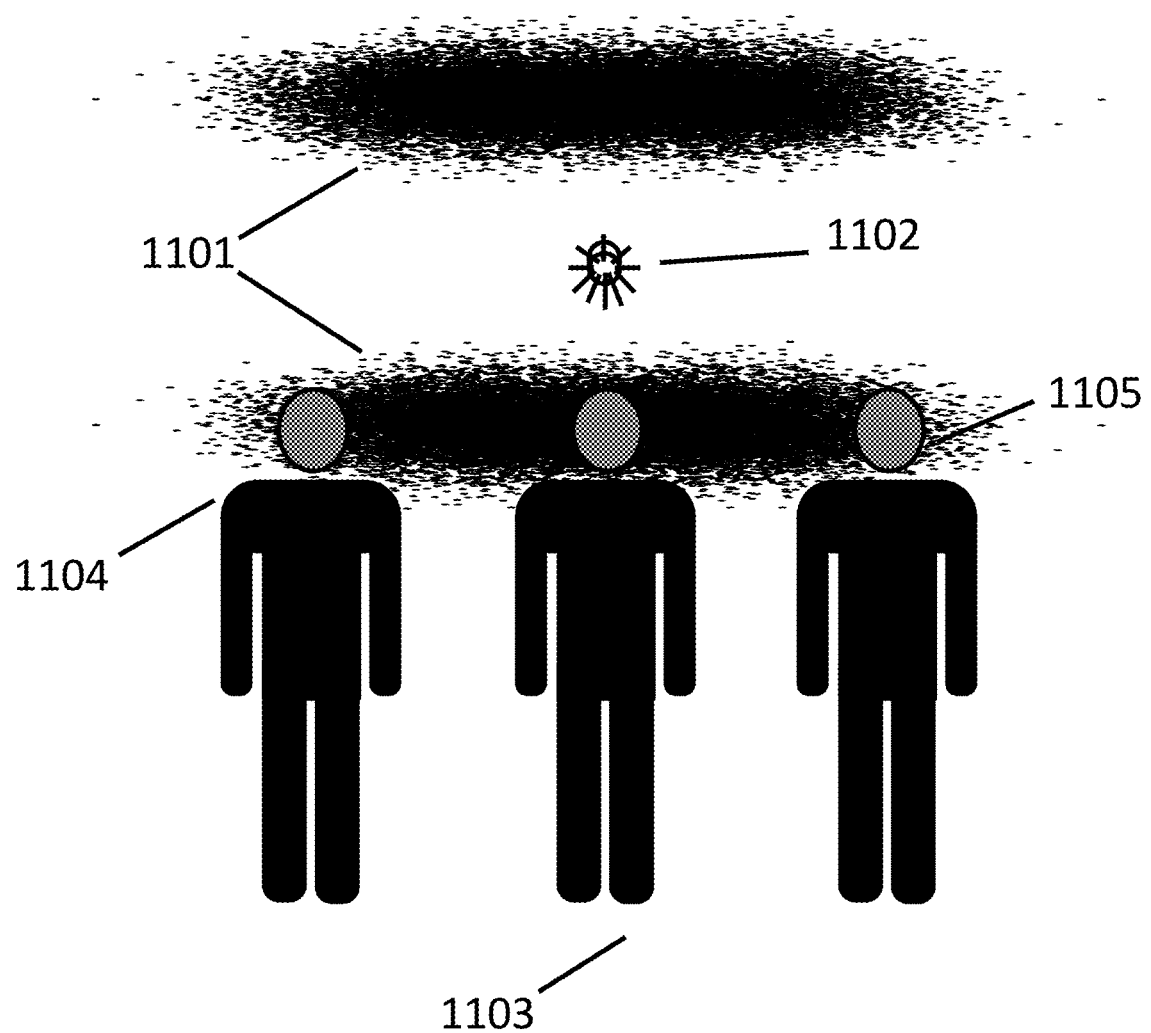
FIG. 11 schematically shows the retro-reflected light intensity profile for a retro-reflective display system incorporating a split retro-reflective return profile combined with an optical element with horizontally diffusing properties.

FIG. 11 schematically shows the retro-reflected light intensity profile for a retroreflective display system incorporating a split retro-retroreflective return profile combined with an optical element with horizontally diffusing properties. The configuration shown in this figure is similar to that shown in FIG. 10 except that the light profile shaping medium 504 (FIG. 5), 602 (FIG. 6) is designed to have an asymmetric diffusion profile with a larger amount of diffusion in the nominal horizontal direction versus less or minimal diffusion in the vertical direction. Advantageous characteristics of this configuration include: a) relative large horizontal spread so intended viewers 1103, 1104 and 1105 are all within the high intensity retro-reflected region with a reasonable distance from projector source 1102 and b) a large angular offset between the projector source 1102 and the primary viewers. A key advantage of decoupling the diffusing and splitting properties in this manner can be understood now with the realization that a single retroreflective sheeting configuration can be combined with different optical sheeting elements to provide optimal system level retro-reflected return profiles matched to different use cases. The two examples shown in FIG. 10 and FIG. 11 demonstrate that the same split retroreflective medium profile can be used for the two very different final return intensity profiles shown in the two figures by employing separate media (e.g., layers) to provide the diffusion function and the splitting function.

Retroflective Displays Configured to Display Images at High Viewing Angles

Figure 12:
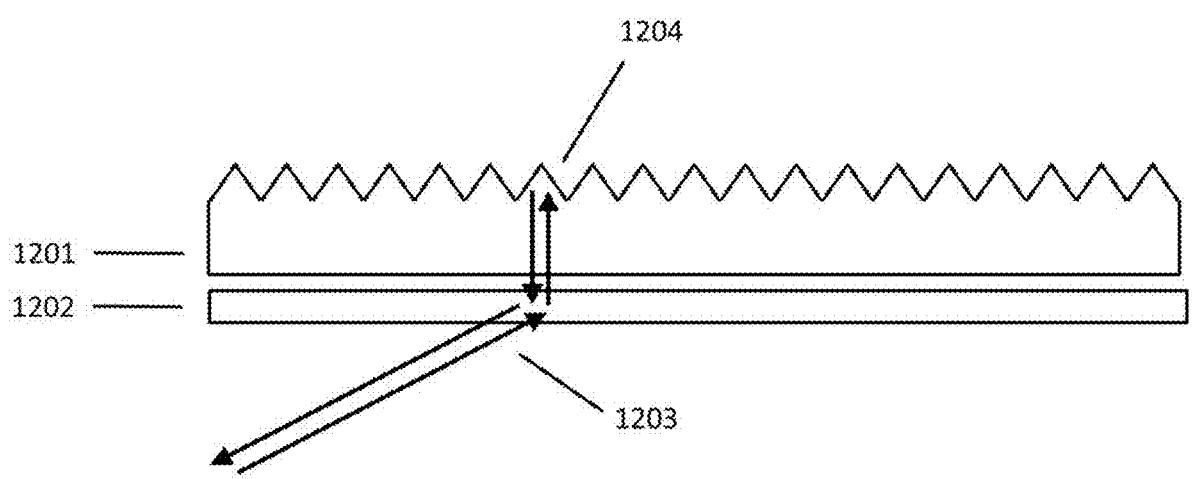
FIG. 12 schematically shows a cross-sectional view of an illustrative screen portion of a retro-reflective display system utilizing an optical light bending layer.

FIG. 12 schematically shows a cross-sectional view of an illustrated screen portion of a retroreflective display system having a display configured to display an image at a high viewing angle by utilizing an optical light bending medium 1202 (for example, a direction turning film or layer), according to embodiments. As described herein, a viewing angle refers to an angle between a viewing position and a direction normal to a major surface of the display. According to embodiments, the display screen comprises a retroreflective display medium 1201 configured to display an image by retroreflectively reflecting light from a light source. The display screen additionally comprises a light bending medium 1202 interposed between the retroreflective display medium and the light source, and configured to substantially bend light passing therethrough, such that the display screen is configured to display the image retro-reflectively from the light source that is positioned at an angle of at least 15 degrees with respect to the a layer normal of the light bending medium.

In operation, an incident light (arrow 1203 pointing towards the light bending medium 1202) enters the light bending medium 1202 from the light source at a first angle with respect to a layer normal, and subsequently enters the retroreflective display medium 1201 at a second angle smaller than the first angle by at least 10 degrees, 15 degrees, 20 degrees, 30 degrees or 40 degrees or 45 degrees, or an angle having a value in a range defined by any of these values, with respect to the layer normal. The light bending layer changes the direction of light passing through film 1202 as shown by arrows 1203 and 1204. Examples of the light bending medium 1202 include, e.g. a film which includes a prismatic structure on one side with or without a light shaping layer (e.g., light diffusing or splitting layer described elsewhere in this application) on the other side, as described further in http://www.luminitco.com/products/lenticular-batwing-diffusers, whose content downloaded on Mar. 31, 2017, is incorporated herein in its entirety, as well as described further in http://www.film-optics.co.uk/images/datasheets/APF36-55-105-250PC%20Rev3%20Light%20turning%20film.pdf whose content downloaded on Mar. 31, 2017, is incorporated herein in its entirety When a light The benefit of this configuration is to enable a high system level entrance angle for the viewer and projector source while still maintaining a low entrance angle for the light incident and reflecting from the retroreflective optical elements as shown by 1204. This screen configuration can be used in scenarios where all or portions of the screen might result in high observation angles. Examples include but are not limited to floors, ceilings and intersections between walls and floors or ceilings.

Retroflective Display Systems Configured to Display Images Having a Shaped Profile or Images at High Viewing Angles Another aspect of the present disclosure provides a system that is programmed or otherwise configured to implement the methods of the disclosure. The system can include a computer server that is operatively coupled to a projector and a photo detector. The projector and photo detector can be standalone units, or integrated as a projection and detection system.

Figure 13:
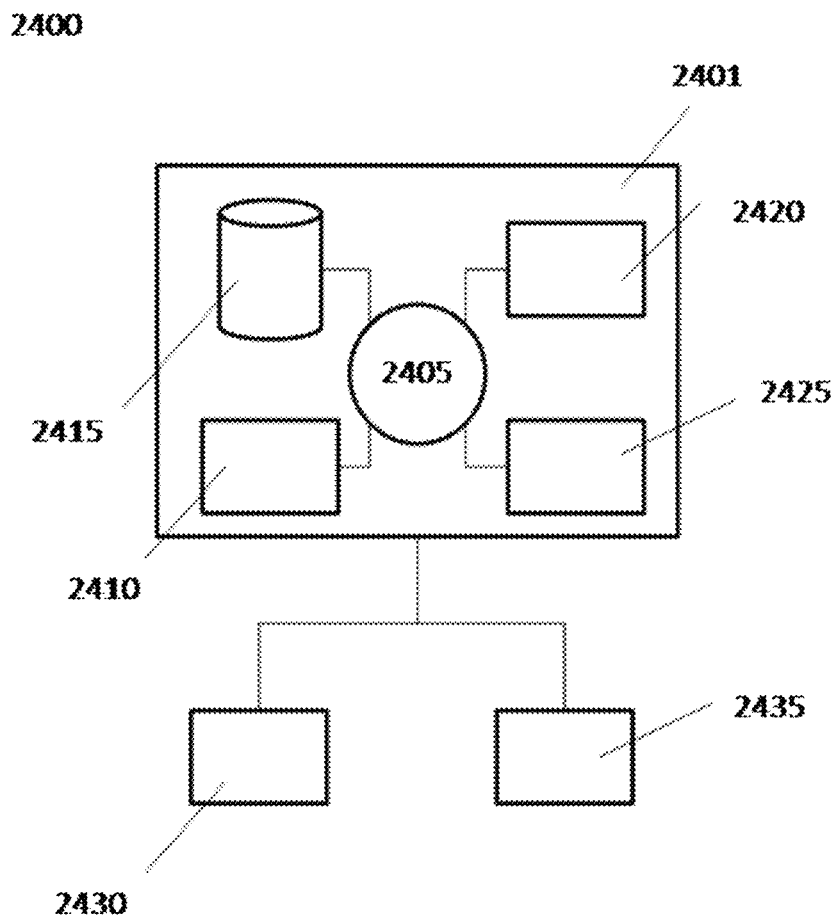
FIG. 13 schematically illustrates a computer system programmed or otherwise configured to facilitate methods of the present disclosure.

FIG. 13 shows a system 2400 comprising a computer server ("server") 2401 that is programmed to implement methods disclosed herein. The server 2401 includes a central processing unit (CPU, also "processor" and "computer processor" herein) 2405, which can be a single core or multi core processor, or a plurality of processors for parallel processing. The server 2401 also includes memory 2410 (e.g., random-access memory, read-only memory, flash memory), electronic storage unit 2415 (e.g., hard disk), communication interface 2420 (e.g., network adapter) for communicating with one or more other systems, and peripheral devices 2425, such as cache, other memory, data storage and/or electronic display adapters. The memory 2410, storage unit 2415, interface 2420 and peripheral devices 2425 are in communication with the CPU 2405 through a communication bus (solid lines), such as a motherboard. The storage unit 2415 can be a data storage unit (or data repository) for storing data. The server 2401 can be operatively coupled to a computer network ("network") with the aid of the communication interface 2420. The network can be the Internet, an internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the server 2401, can implement a peer-to-peer network, which may enable devices coupled to the server 2401 to behave as a client or a server.

The storage unit 2415 can store files or data. The server 2401 can include one or more additional data storage units that are external to the server 2401, such as located on a remote server that is in communication with the server 2401 through an intranet or the Internet.

In some situations, the system 2400 includes a single server 2401. In other situations, the system 2400 includes multiple servers in communication with one another through an intranet and/or the Internet.

The server 2401 can be adapted to store user information and data of or related to a projection environment, such as, for example, display angles and intensity settings. The server 2401 can be programmed to display an image or video through a projector coupled to the server 2401.

Methods as described herein can be implemented by way of machine (or computer processor) executable code (or software) stored on an electronic storage location of the server 2401, such as, for example, on the memory 2410 or electronic storage unit 2415. During use, the code can be executed by the processor 2405. In some cases, the code can be retrieved from the storage unit 2415 and stored on the memory 2410 for ready access by the processor 2405. In some situations, the electronic storage unit 2415 can be precluded, and machine-executable instructions are stored on memory 2410.

The code can be pre-compiled and configured for use with a machine have a processer adapted to execute the code, or can be compiled during runtime. The code can be supplied in a programming language that can be selected to enable the code to execute in a pre-compiled or as-compiled fashion.

The server 2401 is coupled to (e.g., in communication with) a projector 2430 and a photo detector 2435. In an example, the projector 2430 can project an image or video onto a retroreflective screen. In another example, the projector 2430 can project ultraviolet or infrared light onto the retroreflective screen. The photo detector 2435 can detect (or measure) reflected light from the retroreflective screen.

The projector 2430 can include one or more optics for directing and/or focusing an image or video onto the retroreflective screen. The photo detector can be a device that is configured to generate an electrical current upon exposure to light, such as, for example, a charge-coupled device (CCD).

Aspects of the systems and methods provided herein, such as the server 2401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Methods and systems of the present disclosure can be implemented by way of one or more algorithms. An algorithm can be implemented by way of software upon execution by the central processing unit 2405.

Figure 14:
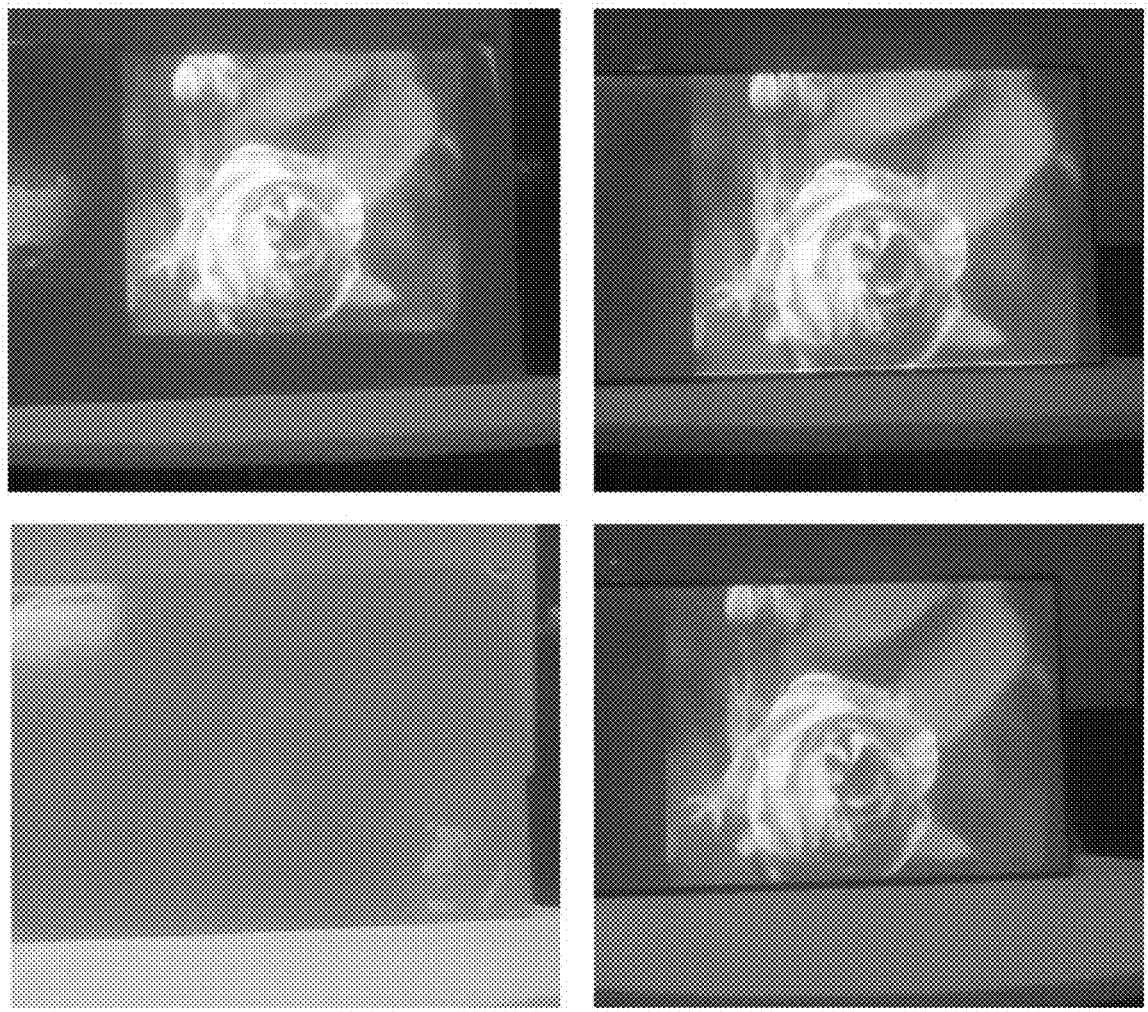
FIG. 14 shows photos of experimental realization of the benefit of the methods in the present disclosure.

FIG. 14 shows photos of experimental realization of the benefit of the methods in the present disclosure. All four depicted photos were taken in the same ambient lighting condition within a span of 10 minutes and using the same projector and image file. The two photos on the left show a retro-reflected image without image profile modification as described in this disclosure. The photo on the top left was taken with a camera in close proximity to the projector source and shows a bright image as expected. The photo on the bottom left was taken with a camera positioned 20 inches above the projector source. In this photo, the image is barely discernable. The two photos on the right show the same retro-reflected image but using the methods outlined in this disclosure. Specifically, for this screen/display an asymmetric diffuser film is in front of the retro-reflected layer. The photo on the top right was taken with a camera in close proximity to the projector source and shows a bright image similar to the photo on the top left. The key difference and improvement is seen in the photo on the bottom right which was taken with a camera positioned 20 inches above the projector source. The image remains very bright and vibrant even though the view (camera) is no longer in close proximity to the projector source. These photos shown in FIG. 14 provide experimental validation of the schematic illustration shown in FIG. 8.

Example Embodiments

1. A retroreflective display screen configured to display an image using a shaped light profile, the retroreflective display screen comprising:
   a retroreflective display medium configured to display an image by retroreflectively reflecting incident light from a light source; and
   a light profile shaping medium interposed between the retroreflective display medium and the light source, wherein the light profile shaping medium is configured to shape an intensity distribution of light reflected from the retroreflective display medium, prior to displaying the image to a viewer.

2. The retroreflective display screen of Embodiment 1, wherein the light profile shaping medium is configured to broaden and/or split the intensity distribution along at least one lateral direction parallel to a major surface of the display screen.

3. The retroreflective display screen of Embodiment 2, wherein the light profile shaping medium comprises a transparent light diffusing layer comprising one or both of a prismatic structure and a plurality of protrusions.

4. The retroreflective display screen of Embodiment 3, wherein the light profile shaping medium comprises a light diffusing layer having a major surface having the protrusions that are randomly arranged in at least one direction parallel to the major surface of the light profile shaping medium.

5. The retroreflective display screen of Embodiment 4, wherein the protrusions are elongated preferentially in at least one direction parallel to the major surface of the light diffusing layer.

6. The retroreflective display screen of Embodiment 3, wherein the light profile shaping medium comprises a prismatic structure configured to split a light beam into a plurality of light beams.

7. The retroreflective display screen of Embodiment 6, wherein the light profile shaping medium comprises the prismatic structure on a first side and the protrusions on a second side opposite the first side.

8. The retroreflective display screen of Embodiment 3, wherein the light profile shaping medium comprises a light diffusing layer having a major surface having protrusions that are periodically arranged along at least one lateral direction parallel to the major surface of the light profile shaping medium.

9. The retroreflective display screen of Embodiment 3, wherein the light profile shaping medium is configured to broaden the intensity distribution of the light reflected from the retroreflective display medium such that upon passing therethrough, a displayed intensity distribution of the light reflected from the retroreflective display medium increases by factor exceeding 2 in a full width at half maximum (FWHM) in the at least one lateral direction parallel to the major surface of the display screen.

10. The retroreflective display screen of Embodiment 9, wherein the display screen is configured such that the displayed intensity distribution is radially symmetric relative to an incident light path of the incident light.

11. The retroreflective display screen of Embodiment 9, wherein the display screen is configured such that the displayed intensity distribution is radially asymmetric an incident light path of the incident light.

12. The retroreflective display screen of Embodiment 11, wherein the display screen is configured such that the displayed intensity distribution is elongated in a direction parallel to the major surface of the display screen and perpendicular to a ground.

13. The retroreflective display screen of Embodiment 11, wherein the display screen is configured such that the displayed intensity distribution is elongated in a direction parallel to the major surface of the display screen and parallel to a ground.

14. The retroreflective display screen of Embodiment 11, wherein the display screen is configured such that the displayed intensity distribution is elongated in direction parallel to the screen and angled relative to a direction perpendicular or parallel to a ground.

15. The retroreflective display screen of Embodiment 9, wherein the display screen is configured such that the displayed intensity distribution is centered about an incident light path of the incident light source.

16. The retroreflective display screen of Embodiment 9, wherein the light profile shaping medium is configured such that the displayed intensity distribution has a ratio between a first full width at half maximum (FWHM) in a first lateral direction parallel to a major surface of the light profile shaping medium, and a second FWHM in a second lateral direction orthogonal to the first lateral direction, that is greater than about 2.

17. The retroreflective display screen of Embodiment 99, wherein the light profile shaping medium is configured such that the light reflected from the retroreflective display medium comprises a plurality of displayed intensity distributions.

18. The retroreflective display screen of Embodiment 17, wherein the displayed intensity distributions are separated in a direction parallel to the major surface of the display screen and perpendicular to a ground.

19. The retroreflective display screen of Embodiment 18, wherein one of the displayed intensity distributions is centered about an incident light path of the incident light.

20. The retroreflective display screen of Embodiment 18, wherein the displayed intensity distributions are outside of an incident light path of the incident light.

21. The retroreflective display screen of Embodiment 1, wherein the retroreflective display medium configured to display a primary image by retroreflectively reflecting incident light from the light source towards a first viewing position, and wherein the display screen further comprises a secondary display medium that is interposed between the retroreflective display medium and the light profile shaping medium and configured to display a secondary image.

22. The retroreflective display screen of Embodiment 21, wherein the retroreflective display medium is configured such that the primary image is visible from a first viewing position within a first range of observation angles, and wherein the secondary display medium is configured such that the secondary image is visible from a second viewing position within a second range of observation angles substantially greater than the first range of observation angles and including the first range of observation angles.

23. A display screen configured to display an image at a high viewing angle, comprising:
  a retroreflective display medium configured to display an image by retroreflectively reflecting light from a light source; and
  a light bending medium interposed between the retroreflective display medium and the light source, wherein the light bending medium is configured to substantially bend light passing therethrough, such that the display screen is configured to display the image retroreflectively from the light source that is positioned at an angle of at least 15 degrees with respect to the a layer normal of the light bending medium.

24. The display screen of Embodiment 23, wherein the light bending medium is configured such that light from the light source that is incident on the light bending medium at a first angle with respect to the layer normal of the light bending medium is bent upon passing through the light bending medium prior to being incident on the retroreflective display medium, such that light incident on a first surface of the retroreflective display medium is incident at a second angle smaller than the first angle by at least 15 degrees with respect to the layer normal.

25. The display screen of Embodiment 24, wherein the light bending medium comprises a film which includes a prismatic structure.

26. The display screen of Embodiment 24, wherein the light bending medium is configured such that light reflected from the retroreflective display medium is incident on a second surface of the light bending medium opposite the first surface of the light bending medium at a third angle with respect to the layer normal, and that the light incident on the second surface of the light bending medium and passing therethrough is further bent prior to exiting the light bending medium at a fourth angle greater than the third angle by least 15 degrees with respect to the layer normal, prior to displaying the image to a viewer.

27. The display screen of Embodiment 26, wherein one or both a difference between the first angle and the fourth angle and a difference between the second angle and the third angle is less than about 20 degrees.

28. The display screen of Embodiment 23, further comprising a light profile shaping medium according to Embodiments 1-22.

29. The display screen of Embodiment 28, wherein the prismatic structure is formed on a first side of the light bending medium, and wherein the light profile shaping medium is formed at a second side opposite the first side of the light bending medium.

30. A display system configured to display an image having a shaped light profile, comprising:
  the display screen according to any of Embodiments 1-29;
  a light source comprising a projector configured to direct the incident light towards the display screen to display the image having the shaped light profile; and
  a micro-processor in communication with the projector, wherein the micro-processor is programmed to control the light source to direct the incident light towards the display screen.

31. The display system of Embodiment 30, wherein the light source is configured to be mounted above a ground in a vertical direction.

32. The display system of Embodiment 31, wherein the shaped light profile has an intensity distribution that is elongated in a direction parallel to the major surface of the display screen and perpendicular to the ground.

33. The display system of Embodiment 31, wherein the shaped light profile has an intensity distribution that is elongated in a direction parallel to the major surface of the display screen and parallel to the ground.

34. The display system of Embodiment 31, wherein the shaped light profile comprises an intensity distribution centered about an incident light path of the incident light.

35. The display system of Embodiment 31, wherein the shaped light profile comprises a plurality of intensity distributions that are separated in the vertical direction.

36. The display system of Embodiment 31, further comprising a sound system for providing sound to complement the image having the shaped light profile, wherein the images having the shaped profile comprise a still image or a video.

37. The display system of Embodiment 31, wherein the image having the shaped profile comprises a three-dimensional image.

38. A method of displaying images having a shaped profile, the method comprising:
   directing an incident light from a light source towards a display screen, including a retroreflective display medium and a light profile shaping medium; and
   displaying an image by retroreflectively reflecting the incident light, wherein displaying the image includes shaping an intensity distribution of light reflected from the retroreflective display medium prior to displaying the image to a viewer.

39. The method of Embodiment 38, wherein shaping the intensity distribution includes broadening and/or splitting the intensity distribution along at least one lateral direction parallel to a major surface of the display screen.

40. The method of Embodiment 38, wherein shaping the intensity distribution comprises distributing the intensity distribution to have a full width at half maximum (FWHM) that is less than 20 degree when measured in at least one radial direction from a center of the displayed intensity distribution.

41. The method of Embodiment 38, wherein shaping the intensity distribution comprises broadening the intensity distribution radial-symmetrically or radial-asymmetrically.

42. The method of Embodiment 38, wherein shaping the intensity distribution comprises distributing the intensity to be centered about an incident light path of the incident light.

43. The method of Embodiment 38, wherein shaping the intensity distribution comprises distributing the intensity to have a ratio between a first full width at half maximum (FWHM) in a first lateral direction parallel to a major surface of the light profile shaping medium, and a second FWHM in a second lateral direction orthogonal to the first lateral direction, that is greater than about 2.

44. The method of Embodiment 38, wherein shaping the intensity distribution comprises splitting the intensity distribution into a plurality of displayed intensity distributions.

45. The method of Embodiment 38, wherein shaping the intensity distribution comprises distributing the intensity to be centered about an incident light path of the incident light.

46. The method of Embodiment 38, wherein shaping the intensity distribution comprises distributing the intensity to be outside of an incident light path of the incident light.

47. The method of Embodiment 38, wherein directing the incident light from the light source towards the stack comprises passing the incident light above eyes of a viewer, and wherein shaping the intensity distribution comprises elongating towards the eyes of the viewer in a plane parallel to a major surface of the display screen.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a measurement error.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states.

The teachings of the disclosure herein can be applied to other systems, not necessarily the systems described above. The elements and acts of the various embodiments described above can be combined to provide further embodiments. The acts of the methods discussed herein can be performed in any order as appropriate. Moreover, the acts of the methods discussed herein can be performed serially or in parallel, as appropriate.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. Accordingly, the scope of the present inventions is defined by reference to the claims.

What is claimed is:

1. A retroreflective display screen configured to display an image using a shaped light profile, the retroreflective display screen comprising:
   a retroreflective display medium configured to display an image by retroreflectively reflecting incident light from a light source; and
   a light profile shaping medium interposed between the retroreflective display medium and the light source, wherein the light profile shaping medium is configured to shape an intensity distribution of light reflected from the retroreflective display medium, prior to displaying the image to a viewer,
   wherein the light profile shaping medium is configured to broaden the intensity distribution of the light reflected from the retroreflective display medium such that upon passing therethrough, a displayed intensity distribution of the light reflected from the retroreflective display medium increases by a factor exceeding 2 in a full width at half maximum (FWHM) in at least one lateral direction parallel to a major surface of the display screen.

2. The retroreflective display screen of claim 1, wherein the light profile shaping medium is further configured to split the intensity distribution along at least one lateral direction parallel to the major surface of the display screen.

3. The retroreflective display screen of claim 1, wherein the light profile shaping medium comprises a transparent light diffusing layer comprising one or both of a prismatic structure and a plurality of protrusions.

4. The retroreflective display screen of claim 1, wherein the light profile shaping medium comprises a light diffusing layer having a major surface having protrusions that are randomly arranged in at least one direction parallel to the major surface of the light profile shaping medium.

5. The retroreflective display screen of claim 4, wherein the protrusions are elongated preferentially in at least one direction parallel to the major surface of the light diffusing layer.

6. The retroreflective display screen of claim 3, wherein the light profile shaping medium comprises the prismatic structure configured to split a light beam into a plurality of light beams.

7. The retroreflective display screen of claim 6, wherein the light profile shaping medium comprises the prismatic structure on a first side and the protrusions on a second side opposite the first side.

8. The retroreflective display screen of claim 1, wherein the light profile shaping medium comprises a light diffusing layer having a major surface having protrusions that are periodically arranged along at least one lateral direction parallel to the major surface of the light profile shaping medium.

9. The retroreflective display screen of claim 1, wherein the display screen is configured such that the displayed intensity distribution is radially symmetric relative to an incident light path of the incident light.

10. The retroreflective display screen of claim 1, wherein the display screen is configured such that the displayed intensity distribution is radially asymmetric relative to an incident light path of the incident light.

11. The retroreflective display screen of claim 10, wherein the display screen is configured such that the displayed intensity distribution is elongated in a direction parallel to the major surface of the display screen and perpendicular to a ground.

12. The retroreflective display screen of claim 10, wherein the display screen is configured such that the displayed intensity distribution is elongated in a direction parallel to the major surface of the display screen and parallel to a ground.

13. The retroreflective display screen of claim 10, wherein the display screen is configured such that the displayed intensity distribution is elongated in direction parallel to the screen and angled relative to a direction perpendicular or parallel to a ground.

14. The retroreflective display screen of claim 1, wherein the display screen is configured such that the displayed intensity distribution is centered about an incident light path of the incident light source.

15. The retroreflective display screen of claim 1, wherein the light profile shaping medium is configured such that the displayed intensity distribution has a ratio between a first full width at half maximum (FWHM) in a first lateral direction parallel to a major surface of the light profile shaping medium, and a second FWHM in a second lateral direction orthogonal to the first lateral direction, that is greater than about 2.

16. The retroreflective display screen of claim 1, wherein the light profile shaping medium is configured such that the light reflected from the retroreflective display medium comprises a plurality of displayed intensity distributions.

17. The retroreflective display screen of claim 16, wherein the displayed intensity distributions are separated in a direction parallel to the major surface of the display screen and perpendicular to a ground.

18. The retroreflective display screen of claim 17, wherein one of the displayed intensity distributions is centered about an incident light path of the incident light.

19. The retroreflective display screen of claim 17, wherein the displayed intensity distributions are outside of an incident light path of the incident light.

20. A retroreflective display screen configured to display an image using a shaped light profile, the retroreflective display screen comprising:
a retroreflective display medium configured to display an image by retroreflectively reflecting incident light from a light source; and
a light profile shaping medium interposed between the retroreflective display medium and the light source, wherein the light profile shaping medium is configured to shape an intensity distribution of light reflected from the retroreflective display medium, prior to displaying the image to a viewer,
wherein the retroreflective display medium is configured to display a primary image by retroreflectively reflecting the incident light from the light source towards a first viewing position, and wherein the display screen further comprises a non-retroreflective secondary display medium that is interposed between the retroreflective display medium and the light profile shaping medium and configured to display a secondary image.

21. The retroreflective display screen of claim 20, wherein the retroreflective display medium is configured such that the primary image is visible from the first viewing position within a first range of observation angles, and wherein the secondary display medium is configured such that the secondary image is visible from a second viewing position within a second range of observation angles substantially greater than the first range of observation angles and including the first range of observation angles.

22. The retroreflective display screen of claim 20, wherein the secondary display medium is configured to display a content that is independent from a content provided by the light source.

23. The retroreflective display screen of claim 22, wherein the secondary display medium comprises a mirror or a layer having a static content.

24. The retroreflective display screen of claim 22, wherein the secondary display medium comprises local regions that are modified to have higher transparency relative to remaining regions.

* * * * *